US008620098B2

(12) United States Patent
Liu et al.

(10) Patent No.: US 8,620,098 B2
(45) Date of Patent: Dec. 31, 2013

(54) TREES FOR ADAPTIVE CODING OF IMAGES AND VIDEOS USING SET PARTITIONING IN GENERALIZED HIERARCHICAL TREES HAVING DIRECTIONALITY

(75) Inventors: Wei Liu, San Jose, CA (US);
Mohammad Gharavi-Alkhansari, Santa Clara, CA (US)

(73) Assignee: Sony Corporation, Tokyo (JP)

( * ) Notice: Subject to any disclaimer, the term of this patent is extended or adjusted under 35 U.S.C. 154(b) by 860 days.

(21) Appl. No.: 12/796,651

(22) Filed: Jun. 8, 2010

(65) Prior Publication Data
US 2010/0310186 A1 Dec. 9, 2010

Related U.S. Application Data

(60) Provisional application No. 61/185,570, filed on Jun. 9, 2009.

(51) Int. Cl.
*G06K 9/46* (2006.01)

(52) U.S. Cl.
USPC .......................................... 382/239; 382/232

(58) Field of Classification Search
None
See application file for complete search history.

(56) References Cited

U.S. PATENT DOCUMENTS

| | | | |
|---|---|---|---|
| 5,315,670 | A | 5/1994 | Shapiro |
| 5,907,637 | A * | 5/1999 | Murashita et al. ............ 382/239 |
| 6,289,131 | B1 | 9/2001 | Ishikawa |
| 7,085,425 | B2 | 8/2006 | Christopoulos et al. |
| 7,221,804 | B2 | 5/2007 | Atsumi et al. |
| 2002/0131497 | A1 * | 9/2002 | Jang ......................... 375/240.11 |
| 2004/0175048 | A1 * | 9/2004 | Pearlman et al. ............ 382/232 |
| 2006/0133680 | A1 * | 6/2006 | Bossen ........................ 382/240 |
| 2010/0310185 | A1 * | 12/2010 | Liu et al. ...................... 382/239 |
| 2010/0310186 | A1 * | 12/2010 | Liu et al. ...................... 382/239 |
| 2011/0249739 | A1 * | 10/2011 | Liu et al. ................. 375/240.12 |

FOREIGN PATENT DOCUMENTS

| | | |
|---|---|---|
| EP | 1037468 A1 | 9/2000 |
| KR | 10-2002-0026175 A | 4/2002 |

OTHER PUBLICATIONS

Sriraja et al A Packetized SPIHT Algorithm with Overcomplete Wavelet Coefficients RURASIP Journal on Applied Signal Processing 2006.*
Pearlman, W.A. et al.—"Efficient, Low-Complexity Image Coding with a Set-Partitioning Embedded Block Coder"—IEEE Trans. CSVT, vol. 14, No. 11, pp. 1219-1235, Nov. 2004.
Chang, C.L. et al.—"Direction-Adaptive Partitioned Block Transform for Image Coding"—IEEE Int. Cont. Image Proc, San Diego, CA, Oct. 2008, pp. 145-148.

(Continued)

*Primary Examiner* — Sean Motsinger
(74) *Attorney, Agent, or Firm* — John P. O'Banion

(57) ABSTRACT

Adaptive entropy encoding and decoding which utilizes Set Partitioning within Generalized Hierarchical Trees (SPRIGHT) and a method of designing trees utilizing directionality. After decorrelation and quantization a tree structure is selected from multiple candidates, based on geometric relationships within the image block, for coding the coefficients toward improving zero-clustering of coefficients. Trees for the SPRIGHT encoding are created in response to finding frequency position of each coefficient and scaling frequency position followed by use of octave-band partitioning of coefficient patterns into squares and L-shapes, and the L-shapes are iteratively partitioned into squares. The tree comprises leaf nodes containing coefficients associated with each non-leaf node. The number of zero clustered coefficients can be increased, thus decreasing the number of nodes coded into the encoded image output.

20 Claims, 18 Drawing Sheets

(56) References Cited

OTHER PUBLICATIONS

WIPO, related PCT Application No. PCT/US2010/037790, International Publication No. WO 2010/144461 dated Dec. 16, 2010, including international search report and written opinion issued on Feb. 18, 2011, pp. 1-46.

WIPO, counterpart PCT Application No. PCT/US2010/037837, International Publication No. WO 2010/144497 dated Dec. 16, 2010, including international search report and written opinion issued on Feb. 18, 2011, pp. 1-64.

Korean Intellectual Property Office, Notice of Preliminary Rejection (Office Action) issued on Jul. 22, 2013, for corresponding Korean Patent Application No. 10-2011-7024126 (International Patent Application No. PCT/US10/037837) English translation (pp. 1-3), including claims examined (pp. 4-9) and original Office Action in Korean (pp. 10-13) pp. 1-13.

\* cited by examiner

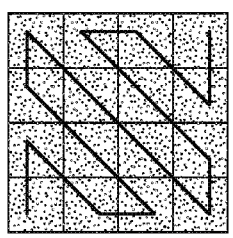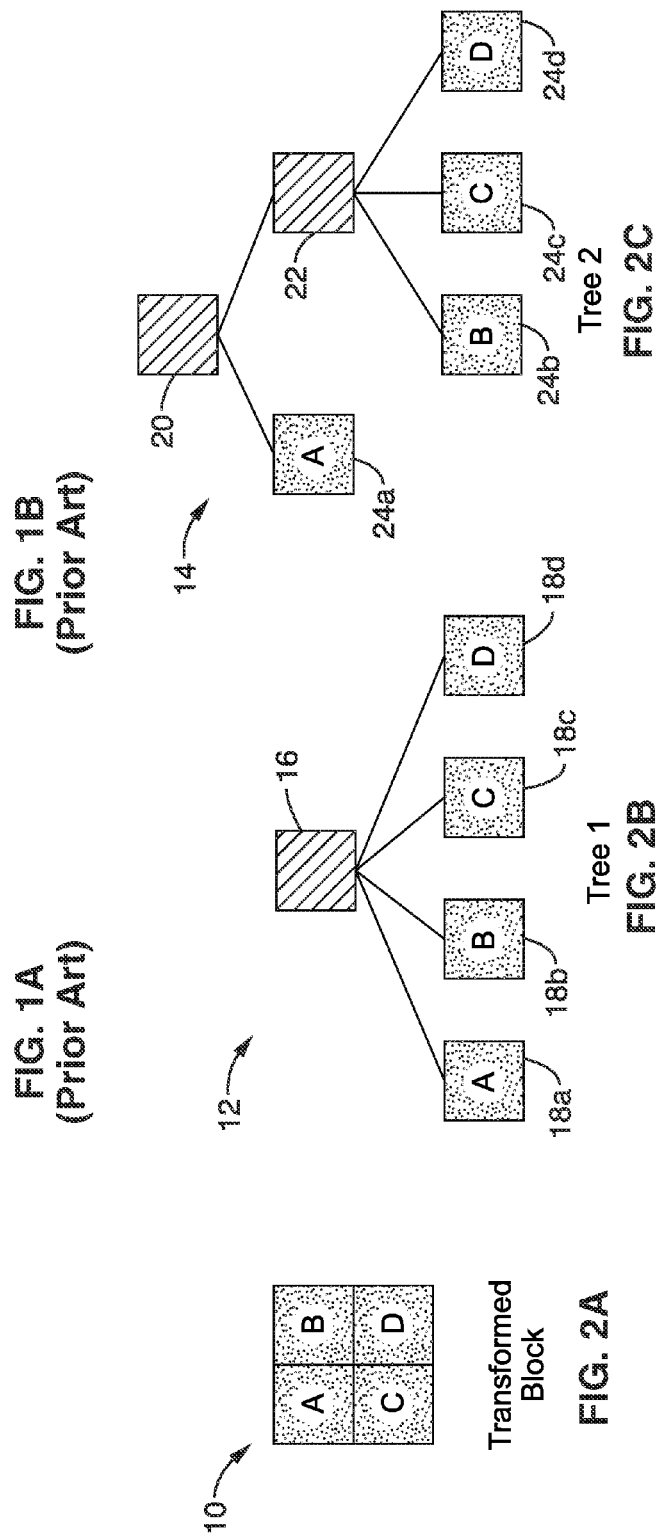

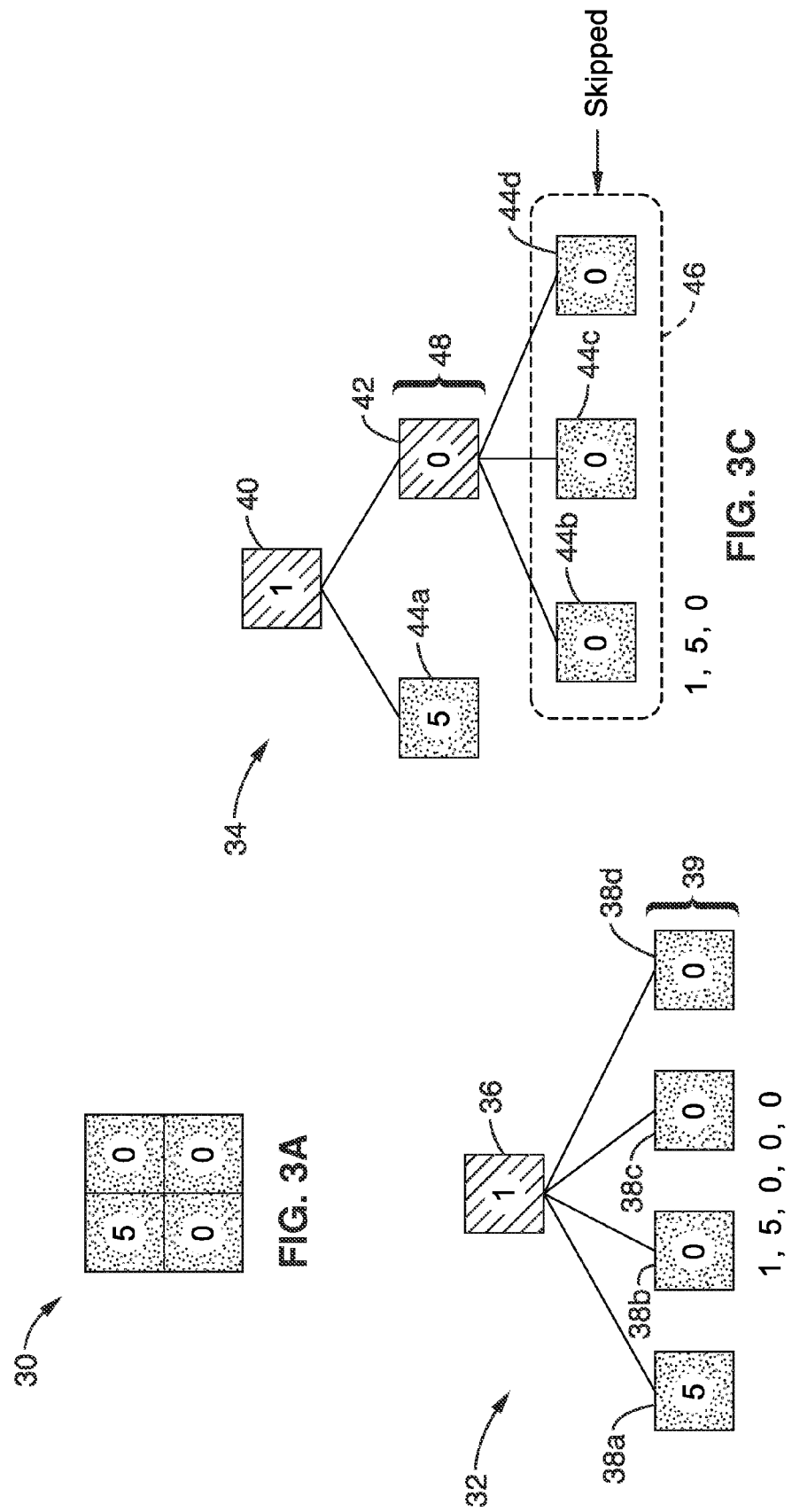

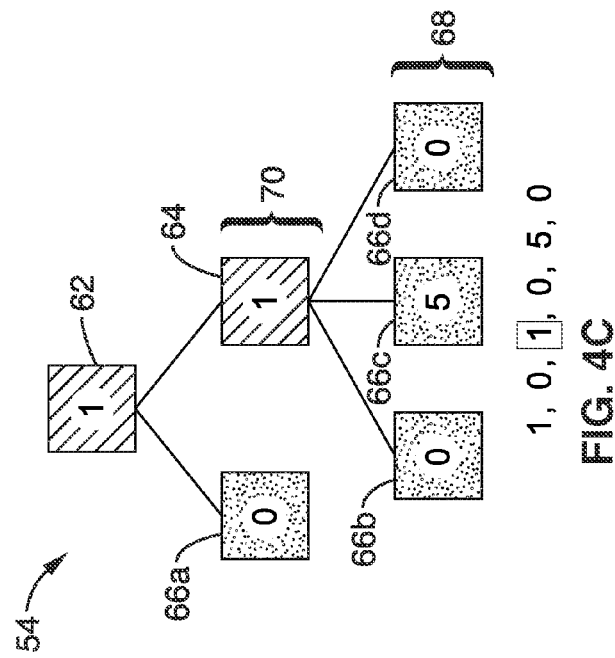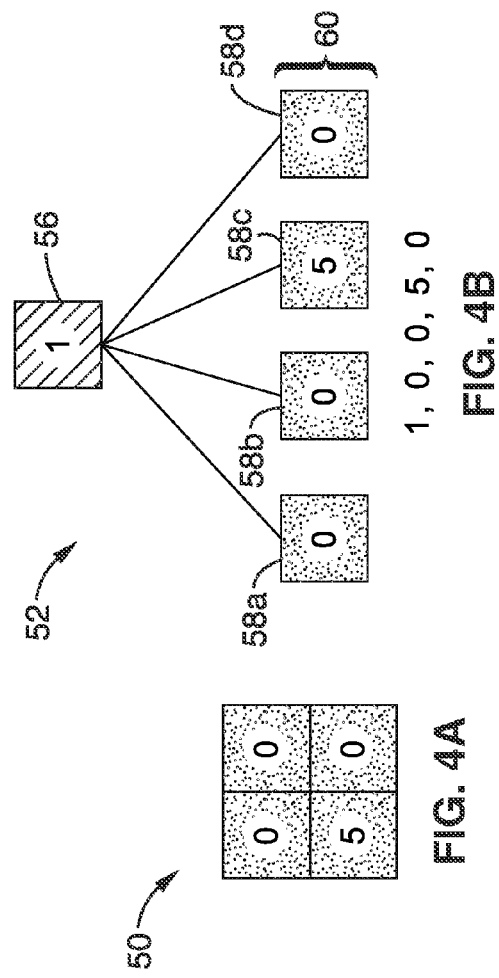

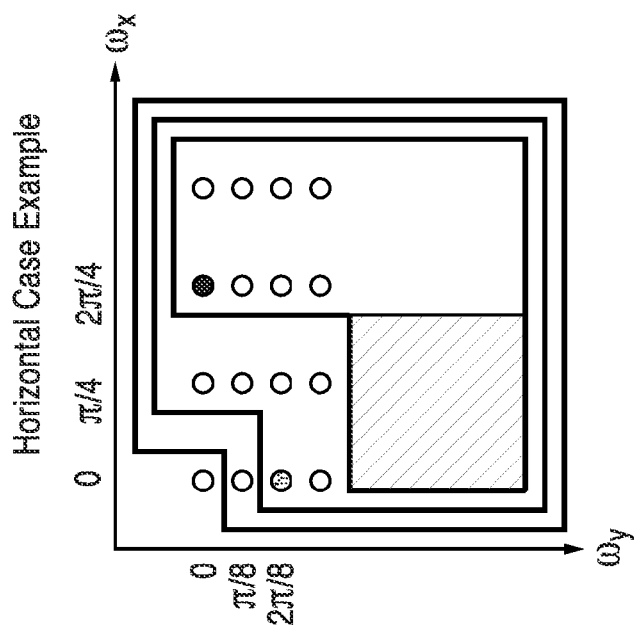
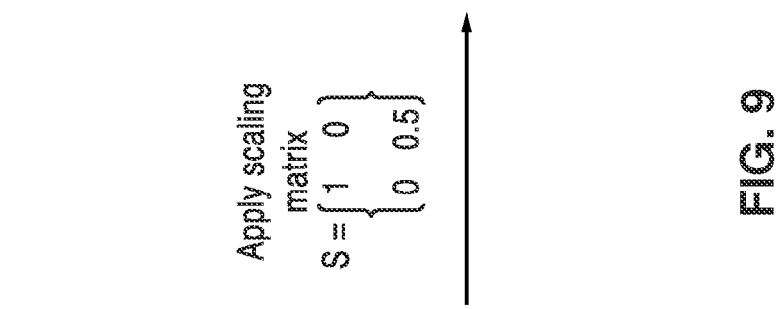
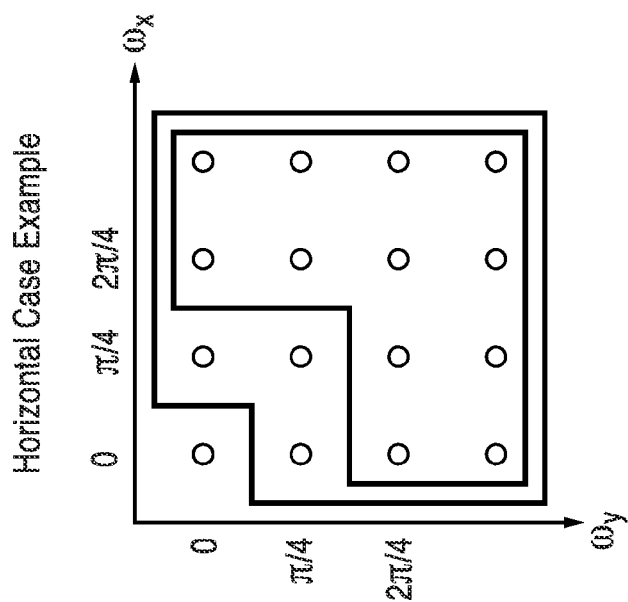
FIG. 9

After $\omega_y$ is Scaled

Map Coefficients to the Frequency Domain

TREES FOR ADAPTIVE CODING OF IMAGES AND VIDEOS USING SET PARTITIONING IN GENERALIZED HIERARCHICAL TREES HAVING DIRECTIONALITY

CROSS-REFERENCE TO RELATED APPLICATIONS

This application claims priority to U.S. provisional patent application Ser. No. 61/185,570 filed on Jun. 9, 2009, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to image and video coding, and more particularly to tree adaptation for use in an adaptive entropy coding apparatus and method utilizing set partitioning in generalized hierarchical trees having directionality.

2. Description of Related Art

Entropy coding is an important constituent of image and video compression, which is usually in response to the steps of (1) transformation (and/or prediction), (2) quantization, and (3) entropy coding.

The following is described for the common JPEG entropy coding method, which stands for Joint Photographic Experts Group and is an ISO/IEC standard for a suite of computer image file compression techniques. A JPEG file is created by choosing from a range of compression qualities, or more accurately, from one of a number of compression algorithms. In converting an image through JPEG compression the target size or quality of the resultant image is specified to a quality level that approximates or is less than the original image. As the highest quality images result in the largest file, a trade-off is made between image quality and file size. The JPEG scheme according to the standard includes twenty-nine (29) distinct coding processes although a JPEG implementer may not use them all.

When performing entropy coding in JPEG, each 8×8 block is transformed using discrete cosine transforms (DCT), and the DCT coefficients are quantized, zig-zag scanned, and run-length coded. It will be recognized that run-length coding provides a way of encoding image data at lower rates by creating linear groups of identical pixels rather than storing the values of each pixel individually. Discrete Cosine Transformation (DCT) provides a mechanism for expressing any waveform as a weighted sum of cosines, and it is central to numerous forms of signal processing, in particular that of video compression.

FIG. 1A illustrates an example of zig-zag scanning in a 4×4 block, with coefficient locations shown in FIG. 1B. A number of drawbacks exist for performing entropy encoding according to this zig-zag pattern. In particular, there is (1) a lack of rate control mechanisms, while the (2) zig-zag scanning destroys the 2-D dependencies of the DCT coefficients.

It should be understood that the parameters used in quantization partially determine rate control, whereby different quantization parameters typically have to be tried to attain the desired file size.

Regarding the loss of 2-D dependency, it will be seen for example, that coefficient locations 2 and 6 in FIG. 1B are close in frequency spectrum as shown in the 4×4 block, yet they are not adjacent and are actually far from one another in response to the zig-zag scanning order shown in FIG. 1A.

Bit-plane based entropy coding is widely utilized in scalable image coding. In this process, transform coefficients are converted to the binary form, and coded from the most significant bit-plane (MSB) to the least significant bit-plane (LSB). During this process the encoding and decoding of lower bit-planes is based on a knowledge of higher bit-planes. The bitstream coding process can be stopped anywhere, at any depth of bit-planes, toward satisfying a given bitrate budget while providing a reasonably good reconstruction quality. The ability to stop at any point in the coding process is possible since the most important part of each coefficient (MSBs) has been already coded. This bitstream coding mechanism is known as embedded coding and provides good rate control.

Accordingly, a need exists for a method and apparatus for performing rate controllable encoding and decoding which has low complexity and high efficiency. These needs and others are met within the present invention, which overcomes the deficiencies of previously developed entropy-based image/video coding techniques.

BRIEF SUMMARY OF THE INVENTION

The present invention provides tree adaptation for use in an adaptive coding method for images which utilizes set partitioning within generalized hierarchical trees (SPRIGHT). For the sake of simplicity of description, the Set Partitioning in Generalized Hierarchical Trees is referred to herein by the acronym "SPRIGHT". The SPRIGHT encoding method may be utilized for embedded coding as it shares similar features while it can provide improved coding efficiency. The present invention adapts different types of trees for different directional patterns in which the specific tree to be used is selected from multiple trees.

To improve the coding efficiency of 2D visual signals, such as images and videos, the present invention provides for adapting design trees in response to local geometric features, such as directionality. The present invention generates multiple design trees adapted for use in an adaptive entropy coding method which selects a design tree from multiple candidates for coding each block. The coding process, referred to herein as "SPRIGHT coding", may utilize transforms like DCT or DWT, or more advanced transforms such as directional transforms.

SPRIGHT coding follows the general steps of dividing an image or a video frame into blocks, decorrelating each block using a transform, quantizing the transform coefficients, choosing a tree from a set of multiple trees and encoding the block using that chosen tree. Coding efficiency is greatly improved as the tree is not fixed but chosen in response to the 2D relationships which exist within the block of coefficients.

The invention is amenable to being embodied in a number of ways, including but not limited to the following descriptions.

One embodiment of the invention is an apparatus for generating multiple candidate coding trees for use during encoding, comprising: (a) a computer configured for receiving and processing images and/or video frames; and (b) programming executable on the computer for, (b)(i) generating a non-directional coding tree using octave-band partitioning, (b)(ii) generating horizontal and vertical coding trees in response to scaling frequency components in a horizontal or vertical direction, and (b)(iii) octave-band partitioning to create multiple candidate coding trees adapted for horizontal and vertical directions.

At least one implementation of the invention further comprises programming executable on the computer for generating diagonal coding trees, within the multiple candidate coding trees, in response to using directional transforms. In at least one implementation the multiple candidate coding trees are configured for controlling block encoding in response to a predetermined traversal of the tree structure selected from the multiple candidate coding trees. In at least one implementation each candidate coding tree, within the multiple candidate coding trees, is configured with leaf and non-leaf nodes in a specified arrangement; and wherein one or more leaf nodes are configured for containing coefficients associated with each non-leaf node. In at least one implementation each candidate coding tree, within the multiple candidate coding trees, is configured so that the state of each non-leaf node is represented by a bit indicating whether its descendent leaf nodes contain all zero coefficients, or do not contain all zero coefficients. In at least one implementation the multiple candidate coding trees are configured for retention within an encoder which selects a coding tree for use from the multiple candidate coding trees. In at least one implementation the octave-band partitioning is performed by partitioning of coefficients within the blocks into squares and L-shapes, in which the L-shapes are iteratively partitioned into squares. In at least one implementation the octave-band partitioning is completed when each square contains only one coefficient.

In at least one implementation of the invention the multiple candidate coding trees are configured for use in coding the coefficients in a block after a transform is performed. In at least one implementation the transform comprises a non-directional or directional transform. In at least one implementation encoding of images and/or video frames utilizes a coding tree from the multiple candidate coding trees in response to programming for, partitioning an image of video frame into blocks, and performing a directional transform on a block within an encoder, after which a desired tree structure is selected from the multiple candidates coding trees to perform the coding with, and wherein a coded tree is generated during coding in response to finding a frequency position for each coefficient and performing octave-band partitioning based on the frequency position of each coefficient. In at least one implementation programming is configured for categorizing the coefficients of the block into at least three categories including non-directional, horizontal and vertical from which the encoder selects one mode from the at least three categories for encoding the block. In at least one implementation programming is configured for categorizing the coefficients of the block into categories which include two different diagonal directions from which the encoder selects one mode from the five for encoding the block. In at least one implementation programming is configured for categorizing the coefficients of the block into categories which include two different diagonal directions from which the encoder selects one mode from five possible modes for encoding the block; and in which the categorization of diagonal directions are performed in response to a directional transform operation. In at least one implementation programming is configured for applying a scaling matrix to the block prior to partitioning; wherein scaling by the scaling matrix is performed in response to geometric relationships of the block; and wherein the scaling comprises either vertical or horizontal scaling.

In at least one implementation of the invention the encoding comprises embedded encoding in which the encoding is bit-plane based. In at least one implementation the encoding comprises embedded encoding in which the encoding is bit-plane based; and wherein trees generated during coding are configured so that non-leaf nodes in the selected tree have a high probability that all descendents contain sufficiently small coefficients to be quantized to zero in higher bit-planes. In at least one implementation programming is configured for adaptive entropy encoding within an image/video encoder using design trees, comprising: dividing an image or a video frame into blocks; decorrelating each block using a transform to create blocks of coefficients; quantizing the transform coefficients; selecting a desired tree structure, as the selected tree structure, from the multiple candidate trees in response to determination of geometric relationships within each of the blocks of coefficients for the image; and encoding each of the blocks of coefficients using clustering of zero coefficients in response to the selected tree structure and use of octave band partitioning; wherein a portion of the zero coefficients are eliminated from the encoded output in response to having non-leaf nodes of the selected tree structure represent that the respective leaf nodes contain only zero coefficients, and not coding descendent leaf nodes into an encoded output bit stream generated by the apparatus.

One embodiment of the invention is a system for adaptive encoding and decoding of images or videos, comprising: (a) an encoder having a processing element and memory configured for image and/or video encoding; (b) programming executable on the encoder processing element for performing the steps of, (b)(i) dividing an image or a video frame into blocks, decorrelating each block using a transform to generate blocks of transform coefficients, (b)(ii) quantizing the transform coefficients for each of the blocks of transform coefficients, (b)(iii) selecting a tree structure, as a selected tree structure, from a set of multiple candidate trees, including at least horizontal and vertical directions, in response to determination of geometric relationships within the block of coefficients for the image and/or video, and (b)(iv) encoding the block using clustering of zero coefficients in response to the selected tree structure; wherein a portion of the zero coefficients are eliminated from the encoded output in response to having non-leaf nodes of the selected tree structure represent that respective leaf nodes contain only zero coefficients and not coding these descendent leaf nodes into an output bit stream directed to a decoder; (c) a decoder having a processing element and memory configured for image and/or video decoding of the bitstream from the encoder; (d) programming executable on the decoder processing element for outputting an image or video signal in response to performing the steps of, (d)(i) determining the selected tree structure used by the encoder in encoding the block, (d)(ii) decoding leaves of the selected tree structure into coefficients of an output, (d)(iii) outputting zero coefficients within the output in response to decoding non-leaf nodes without non-zero branches, (d)(iv) performing dequantizing of the output, performing inverse transformation of the output, and reconstructing the image signal in response to receipt of the output.

One embodiment of the invention is a method for generating multiple candidate coding trees for use within an encoder during image and/or video encoding, comprising: (a) generating a non-directional coding tree using octave-band partitioning; (b) generating horizontal and vertical coding trees in response to, (b)(i) scaling frequency components in at least a horizontal and vertical direction, and (b)(ii) octave-band partitioning to create multiple candidate coding trees adapted for at least horizontal and vertical directions.

The present invention provides a number of beneficial aspects which can be implemented either separately or in any desired combination without departing from the present teachings.

An aspect of the invention provides generation of multiple candidate coding trees adapted for an image/video coding process which selects one of the multiple candidates in response to directional characteristics of each image/video block being coded.

Another aspect of the invention is the adaptation of coding trees for an encoding and decoding process that provides high coding efficiency in response to clustering of zero coefficients in the selected tree structure.

Another aspect of the invention is the adaptation of coding trees for use in an encoding and decoding process which does not rely on a fixed tree structure for encoding/decoding each of the blocks.

Another aspect of the invention is the use of a directional transform when adapting multiple coding trees in response to image/video block directionality.

Another aspect of the invention is the use of octave band partitioning during the process of designing adaptive coding trees based on directionality.

Another aspect of the invention is the use of a scaling matrix to scale the block coefficients (vertically and/or horizontally) prior to the octave band partitioning, based on geometric relationships between block pixels.

A still further aspect of the invention is an encoding and decoding method which can be utilized within both embedded and non-embedded image/video coding systems.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIGS. 1A and 1B are 4×4 coefficient block arrays showing a zig-zag scanning order in FIG. 1A and coefficient locations in FIG. 1B.

FIGS. 2A through 2C are 2×2 coefficient data diagrams of a transformed block of four coefficients (A-D) in FIG. 2A, and tree hierarchies in FIGS. 2B and 2C which can be selected for the block according to an aspect of the present invention.

FIGS. 3A through 3C are coefficient data diagrams of a 2×2 coefficient block as shown in FIGS. 2A through 2C and tree hierarchy operations selected for the block according to an aspect of the present invention.

FIGS. 4A through 4C are coefficient data diagrams of a slightly different coefficient block from FIG. 3A, and its associated tree hierarchy operations selected for the block according to an aspect of the present invention.

FIG. 9 is a block partitioning diagram showing horizontal partitioning in response to application of a scaling matrix according to an aspect of the present invention.

DETAILED DESCRIPTION OF THE INVENTION

Figure 5D:
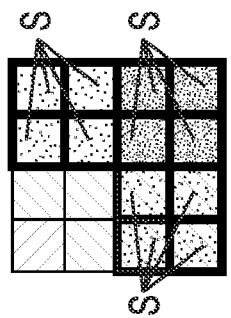
FIGS. 5A through 5E are 4×4 coefficient blocks depicting octave band partitioning and associated design tree, showing four levels of block partitioning into squares, L-shapes and sub-partitioning, such as into half-size squares.

Referring more specifically to the drawings, for illustrative purposes the present invention is embodied in the apparatus generally shown in FIG. 2A through FIG. 24. It will be appreciated that the apparatus may vary as to configuration and as to details of the parts, and that the method may vary as to the specific steps and sequence, without departing from the basic concepts as disclosed herein.

1. Introduction.

Adaptation of coding trees based on directionality is taught for use with the adaptive entropy encoding and decoding apparatus and methods described in our U.S. patent application Ser. No. 12/758,981 filed on Apr. 13, 2010, incorporated herein by reference in its entirety, which utilizes set partitioning within generalized hierarchical trees (SPRIGHT) for the encoding and decoding of images and videos. The present invention details a method of generating these directionally adapted coding trees which can be selected by a SPRIGHT based video coding apparatus or method. SPRIGHT-based coding selects from multiple candidate coding trees generated according to the present invention when coding image blocks.

The SPRIGHT method is performed as an image or a video frame is divided into blocks, with each block decorrelated using a transform, its transform coefficients quantized, and a coding tree is then selected from multiple candidates in response to the geometric relationship found within the block, or more particularly selection is performed in response to the two-dimensional (2D) relationships between the coefficients in the block. The block is then encoded in response to the selected tree structure. Coding efficiency can thus be significantly improved as the coding tree is not fixed across the range of blocks but is chosen for each block in response to the 2D relationships which exist within that block of coefficients.

It should be appreciated that the image or the video frame being coded may be divided into blocks in a number of different ways without departing from the teachings of the present invention. For example, the blocks may be configured in any arbitrary shape or size, they need not be square or regular shaped. Each block may contain either singular or multiple color components. Less preferably, a block may comprise an entire image.

Each block of the image or the video frame is then processed according to the following encoding steps. Values within the block are decorrelated using a transform, for instance a discrete cosine transform (DCT), or other transforms which provide decorrelation (e.g., discrete wavelet transforms (DWT)). It should be appreciated that according to one implementation of the present invention, different types of transforms may be utilized within the same image. If different types of transforms are utilized, then the type of transform used for the block should be communicated to the decoder, such as by signaling the decoder in response to the state of one or more bits being encoded for each block. Regardless of how the transform is performed, it is preferable that the index of the transform be communicated to the decoder to aid in its decoding of the block. Before transform, it will be appreciated that inter-block prediction or pre-filtering can be performed, however, it is not required.

The transform coefficients within the block are then quantized. It should be appreciated that the quantization step will quantize all coefficients to zero which are below a desired quantization threshold.

A coding tree structure is then chosen from multiple candidate tree structures (coding modes) for each block. Tree structure selection is preferably made from a set of multiple coding trees in response to the geometric relationships (e.g., two-dimensional) between the coefficients within each block, and each block is then encoded using the chosen tree structure. These multiple coding trees are preferably predefined according to methods of the present invention. It should be appreciated that the tree structure used for coding of an image block is not fixed for all given blocks, but is selected based on the geometric features of the specific block being coded, whereby coding efficiency can be significantly improved. In a preferred aspect of the invention, the tree structure is selected in response to directionality when classifying geometric features. Information about the chosen tree is signaled to the decoder (e.g., by an index) so that the decoder can determine which tree structure was selected when the block was originally encoded and can thus properly decode the tree-based data within the encoded image.

It should be appreciated that there is typically a relationship between the transform used and the tree structure which is selected. Accordingly, in many implementations the encoder would send one index to denote the (transform, tree) pair, which allows the (transform, tree) to be jointly optimized.

The present invention provides for generating the multiple candidate coding trees for use in the SPRIGHT encoding.

2. Tree Structure in SPRIGHT.

FIG. 2A through FIG. 2C illustrate a transformed 2×2 block and multiple coding tree structures shown by way of example and not limitation. It should be recognized that the invention may be applied to any sized block without departing from the teachings of the present invention.

FIG. 2A depicts, for the sake of simplicity, a small 2×2 transformed block 10, having coefficients A through D. Typically, block sizes range from 4×4, 8×8 and 16×16, 32×32, and so forth, although the block may be configured in any desired shape and size.

In the present invention, each tree is considered a data structure for facilitating encoding and decoding and generally represents a coding mode. Each coding tree is defined with leaf nodes (terminal nodes) connected from non-leaf nodes (non-terminal nodes). Each leaf node represents a coefficient from the block, while each non-leaf node represents a group of coefficients, and more particularly the set of all of its descendents. The non-leaf node known as the root comprises the set of all coefficients for the given block.

FIG. 2B and FIG. 2C exemplify two possible tree structures for the transformed block shown in FIG. 2A. In tree 12 of FIG. 2B a single non-leaf node 16 is shown, which is also the root of the tree, from which four coefficients A-D 18a-18d are directly grouped. In tree 14 of FIG. 2C a non-leaf node 20 is shown, which is also a root 20 from which are associated a leaf node A as 24a and another non-leaf node 22, which associates three leaf nodes B, C and D as 24b, 24c, 24d. Thus, in FIG. 2B all the coefficients are grouped together at once, while in FIG. 2C coefficients B through D are grouped together at the lowest level.

3. SPRIGHT Encoding with a Coding Tree.

The following examples consider encoding using a non-embedded version of SPRIGHT encoding. A breadth first traversal (BFT) of the coding tree is preferably performed, and the outputs are controlled in response to the type of node and coefficient value. If the current node is a leaf, then the value of the coefficient is output. It should be appreciated that the coefficient value is preferably non-binary, and can be coded for example with arithmetic coding. Non-leaf nodes contain one or more leaf nodes, and by way of example are marked with a 1 if at least one descendent leaf has a non-zero coefficient, or marked as 0 if the corresponding set of coefficients are all zeros, whereby all the descendent nodes are skipped. "Skipping" of the descendent nodes means that these nodes are not explicitly encoded into the encoded output stream of bits, thus saving coding space for these zero coefficients. It will be recognized that although the values of 1 and 0 are used for simplicity of explanation for non-leaf node values, any desired values may be utilized for indicating whether or not non-zero descendents exist for a non-leaf node.

FIG. 3A through FIG. 3C and FIG. 4A through FIG. 4D illustrate encoding of 2×2 blocks having similar geometries. By way of example and not limitation, descendency in non-leaf nodes is represented in binary, with "1" indicating that at least one branch has a non-zero coefficient, and "0" indicating that none of the branches have non-zero coefficients. In this example implementation, non-leaf node descendency thus requires coding a single bit per non-leaf node, and thus does not add significantly to the bit budget.

FIG. 3A depicts a block 30 having four coefficients 5, 0, 0, 0. FIG. 3B depicts selecting a first encoding 32 for block 50 which has a single non-leaf node 36 and four leaf nodes 38a through 38d in a single level 39. The output of the coding in FIG. 3B generates a sequence of five values 1, 5, 0, 0, 0. Contrast this coding to that shown in FIG. 3C using a particular two-level tree structure. In the tree 34 of FIG. 3C, a root node 40 has a single leaf node 44a containing a coefficient of value 5, by way of example, and a non-leaf node 42 which clusters the zero nodes comprising three leaf nodes 44b, 44c and 44d in group 46. As these leaf nodes are all zeros, they may be skipped, whereby the respective root 42 is coded with a 0. In response to this coding, the output of this coding sequence is 1, 5, 0 ; which is of course shorter than the coding used in FIG. 3B. The small 2×2 block sizes are shown by way of example, and it should be appreciated that larger block sizes can provide higher levels of coding efficiency increase. In addition, it should be appreciated that although the coefficients are depicted for the sake of illustration as single-digit integers, the actual coefficients require a much larger representational bit-space.

However, if the relationship between the coefficients in the block are slightly different, such as depicted in the block of FIG. 4A, in which the position of one of the coefficients has been moved, then coding efficiency with respect to tree structure is dramatically altered. FIG. 4A depicts a block 50 having four coefficients 0, 0, 5, 0. FIG. 4B depicts encoding in response to a first selected coding tree structure 52 having a single non-leaf node 56 and four leaf nodes 58a through 58d in a single level 60. The output of this coding generates a sequence of five values 1, 0, 0, 5, 0. In FIG. 4C a different coding tree structure 54 is chosen, having a root 62, with a leaf 66a (0 coefficient) and a non-leaf 64 on a first level 70, and a second level 68 with leaves 66b(0), 66c(5 ) and 66d(0). In response to the non-zero value of the coefficient in leaf 66c , the group of coefficients cannot be skipped without introducing error, and non-leaf 64 is coded with a 1 indicating that its leaves must be included in the coding. The coding using this tree generates six outputs 1, 0, 1, 0, 5, 0, and is less efficient than that represented by FIG. 4B.

From the above discussion it is apparent that the selection of a coding tree structure which does not fit the geometric relationships within the block leads to inefficient block coding. It will seen, therefore, that SPRIGHT coding according to the invention is directed to providing proper selection of a coding tree structure from multiple candidate coding trees for any given block toward assuring efficient coding of that block, and creation of the various trees thereof. The present invention provides for the adaptation of trees to provide the multiple candidate coding trees from which a coding tree is selected during SPRIGHT encoding in response to the characteristics of the block being coded.

4. SPRIGHT Decoding with a Tree.

In decoding of the image blocks according to SPRIGHT, the decoder must select the proper tree structure from multiple candidate tree structures, such as in response to receiving information about which tree structure was used for encoding each block. In one aspect of SPRIGHT decoding the decoder receives an index to the tree structure used during encoding. Once the proper tree is selected from multiple candidate coding trees, the tree is traversed during decoding using a technique which is compatible with the encoding process, for example utilizing a breadth first traversal (BFT) of the tree. If the current node is a leaf of the tree, then a symbol is decoded from the bitstream, and the value of the decoded symbol is assigned to the corresponding coefficient. Conversely, if the current node is not a leaf, then one bit is read from the bitstream and operated upon; if the bit is a 1, then the processing continues, but if a 0, then the values of all descendent nodes of the current node are set to be 0 and they are dropped from the tree.

5. Zero Clustering.

In can be seen from the preceding discussions, that the coding gain of the SPRIGHT coding method is largely derived in response to zero-clustering, wherein the zeros produced from transform coding are clustered into a group represented by a single zero in the respective non-leaf node. Conversely, if zeros can only be partitioned with non-zeros, then no bit savings are obtained.

It is well recognized that transform coding usually produces a lot of zeros, and that these zeros may be neighbors of each other. These coefficients may be neighbors in a number of different ways, including with regard to: (1) spatial location whereby they may be neighboring coefficients in the same DWT sub band; or (2) spectral location whereby they may be neighboring DCT coefficients.

SPRIGHT coding makes use of this distinction by selecting a particular tree structure for each block based on the geometric relationship of the coefficients within the block.

The following sections illustrate examples of coding spectral coefficient location, such as using octave-band partitioning to adapt coding trees based on directionality for use with SPRIGHT, and similar coding methods, which select from multiple candidate coding trees for each block being coded.

6. Octave Band Partitioning based Trees within Multiple Tree Types.

In response to selecting trees best suited for a specific geometric pattern within SPRIGHT, coding efficiency for those specific blocks is substantially improved. The present invention adapts coding trees to provide multiple coding trees from which a tree may be selected by SPRIGHT in response to the directional characteristics of the image block being encoded. By way of example, a non-directional coding tree is adapted for use with directional image blocks, including horizontal, vertical, and other patterns, such as diagonal patterns, in response to block geometry. A different coding tree is utilized for each block pattern.

Aspects of octave band partitioning is described and adapted so as to construct a set of multiple trees for use with different directional patterns which can be selected when performing image coding according to SPRIGHT.

FIGS. 5A through 5E illustrate an example embodiment of adapting octave band partitioning based trees for the generation of multiple coding trees from which a coding tree can be selected under SPRIGHT in response to the geometry of the block being coded.

In Octave Band Partitioning the root (i.e., whole block) is partitioned into one small square and one large L-shaped region. In existing implementations the size of the small square is 2×2, whereas the preferred size utilized in the present embodiment of the invention is a 1×1 square (DC only). The present invention adapts octave band partitioning for generating multiple coding trees for use in SPRIGHT encoding of image blocks having a directional component.

Figure 5C:
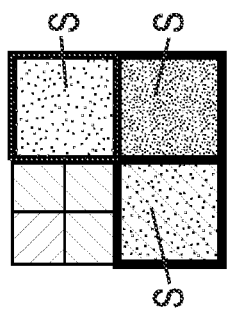
Figure 5B:
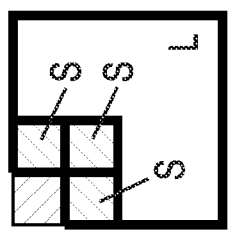
Figure 5A:
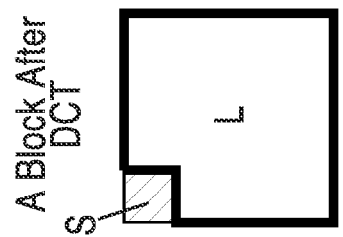

FIG. 5A depicts a root (whole block) after DCT being partitioned into a small square and a large L-shape.

FIG. 5B illustrates the L-shape being iteratively partitioned into three squares and another smaller L-shape.

FIG. 5C illustrates that each time an L is partitioned, its offspring squares are doubled in size, as shown in the figure.

FIG. 5D illustrates iteratively partitioning each non-leaf square into four half-sized squares.

Figure 5E:
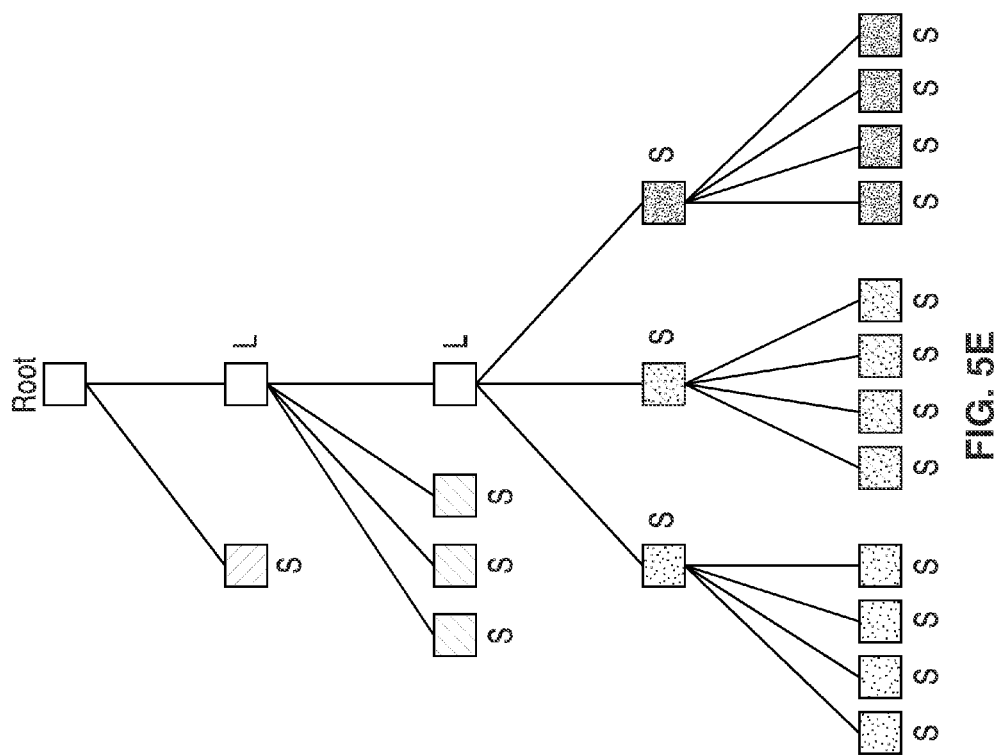

FIG. 5E depicts the design tree associated with the octave-band partitioning method described in FIG. 5A-5D. It will be noted that non-leaf nodes are marked as either "root", "L" (L-shape), or "S" (Square), with respect to their type.

SPRIGHT provides a general tree-based entropy coding method which is configured for using any desired tree structures, and can select a tree structure from multiple candidate coding tree structures such as generated according to adapted octave band partitioning techniques if it suits the type of block being coded (e.g., that is if it is proved to be efficient for certain transforms like DCT). In contrast to this, the coding tree structures used for original octave band partitioning implementations apart from the present invention, are fixed and perform entropy coding of all blocks using the same (fixed) coding tree structure.

In this aspect of the invention the octave band partitioning technique is generalized to generate a plurality of coding trees which can be selected from in response to directionality of the coefficient blocks during encoding. In response to this generalization, SPRIGHT can choose the best tree among multiple pre-designed candidates to improve coding efficiency.

As previously described, SPRIGHT saves bits through "zero-clustering" of coefficients. It is desired under the SPRIGHT method that the tree be organized to maximize the number of non-leaf nodes having all descendent leaves containing zero coefficients, which thus need not be coded. If no significant clustering of zeros would result for a given block coded by a selected coding tree structure, then the SPRIGHT method would be less efficient. However, by properly selecting a tree which suits the geometry of the block being coded, a substantial degree of clustering typically arises allowing SPRIGHT to provide enhanced coding efficiency.

It should be appreciated that when considering an embedded SPRIGHT method, the encoding is bit-plane based, whereby the criteria is somewhat different. Specifically, it is desired that non-leaf nodes in the embedded SPRIGHT tree have all descendents containing only small coefficients. It will be recognized that these coefficients are sufficiently small as to be quantized to zero in higher bit-planes.

Using octave band partitioning trees, including modified octave band partitioning trees, for generating multiple candidates for use under SPRIGHT coding provides numerous benefits under the following conditions. Octave band partitioning is well-suited for cases in which the transform coefficients are small when they are far away from the origin (DC). Therefore, if at a certain bit-plane, an L-shape becomes non-zero (or it contains at least one non-zero coefficient), there is a high probability that the non-zero coefficient(s) are NOT in the smaller L-shape. If the above is true, zero can still be used to represent all the 0's in the smaller L-shape. Although the assumption is often true, there can be numerous exceptions, especially in regard to directional geometric patterns, wherein the present invention is also configured to select different trees in response to the different directional patterns.

7. Design Trees Based on 3-Mode DCT.

In using 3-mode DCT (Discrete Cosine Transform) according to an aspect of the present invention, the image block is classified into three categories: non-directional, horizontal and vertical. It should be appreciated that although the DCT transform is discussed by way example, other forms of transforms and directional transforms may be utilized without departing from the teachings of the present invention. For each of these categories a coding tree is designed in which the original octave band partitioning tree is used for the non-directional case, while coding trees are designed for the horizontal and vertical cases, as described in a later section.

In the process of encoding an image block, a 2D-DCT is first applied on the block. It is then determined which is the most appropriate tree (e.g., for minimizing encoded size) to perform coding with, then coding is performed, and afterward information is generated for use by the decoder, such as signaling the coded bits as well as the tree index to the decoder.

8. Inefficiency of Original Octave Band Partitioning.

It will be appreciated that after performing a 2D-DCT, each coefficient corresponds to a 2D frequency, and their positions can be marked in the frequency domain.

Figure 6:
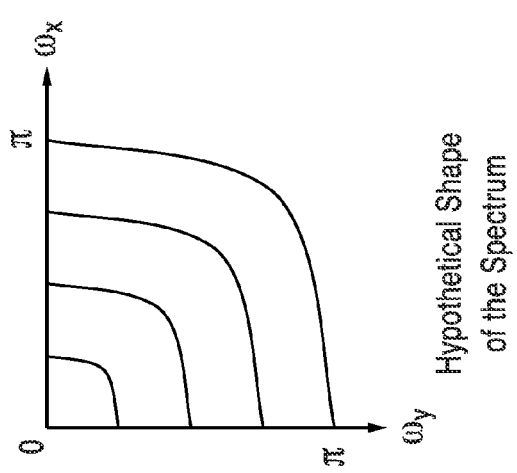
FIG. 6 is a graph showing the hypothetical spectrum shape depicting a symmetric spectral amplitude.

FIG. 6 depicts a symmetric amplitude spectrum which is a basic assumption of the octave band partitioning technique.

Figure 7:
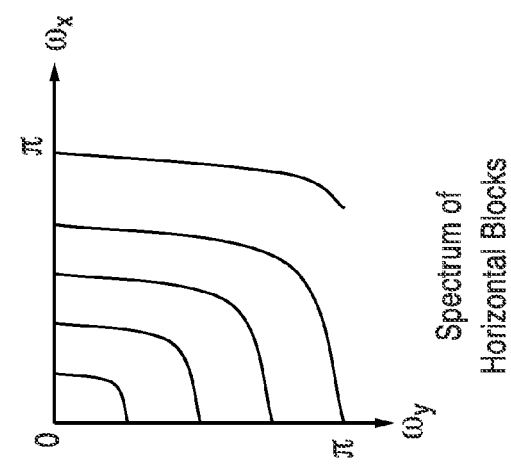
FIG. 7 is a graph showing the spectrum of blocks having a horizontal bias.

FIG. 7 depicts an example spectrum for a horizontal block, showing how that octave band partitioning assumption doesn't hold for directional patterns. It will be noted that the spectrum is "whiter" vertically (i.e., a uniform power spectral density), while the coefficient amplitude decreases slower with respect to $\omega_y$.

Figure 8:
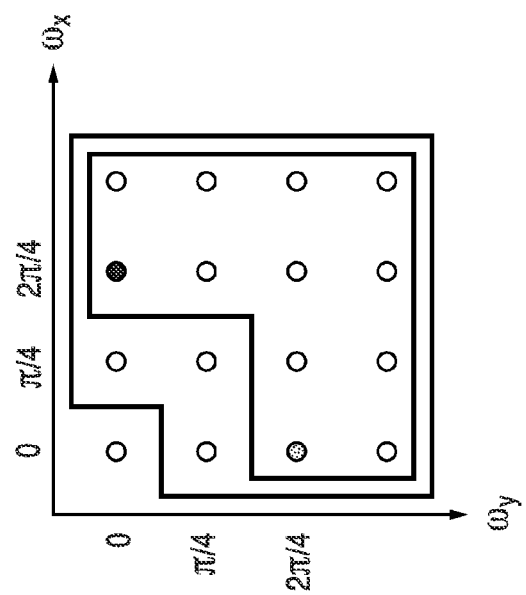
FIG. 8 is a block partitioning diagram showing L-shapes with respect to horizontal and vertical spectrum according to an aspect of the present invention.

FIG. 8 depicts block partitioning according to the octave band partitioning technique, wherein it is seen that some large coefficients (the speckled one on the far left, just below the center) can "leak" to the L-shape, thus requiring further partitioning and loss of efficiency.

It should be appreciated that these partitioning problems can arise for any blocks having a specific geometric inclination, including either horizontal or vertical (for the vertical case, similarly the solid dot at the top just right of the center might be a large coefficient).

9. Frequency Scaling Before Octave Band Partitioning.

Toward overcoming the block partitioning problems described above, which lead to inefficient coding, embodiments of the present invention perform a variation of octave band partitioning in which the frequency is scaled prior to applying octave band partitioning.

Let $\omega=[\omega_x,\omega_y]^T$ be the 2D spatial frequency. The scaling operation is performed as $\omega=S\omega$, where $S=\text{diag}(s_x,s_y)$ is the scaling matrix. The scaling factors $s_x$ and $s_y$ are chosen such that after scaling, the spectrum is more readily partitioned using octave band partitioning. This scaling adapts the octave band partitioning technique for generating coding trees which have a directional nature well-suited for SPRIGHT which selects one coding tree from multiple coding trees based on directional characteristics of the image block being coded.

FIG. 9 illustrates an example embodiment of scaling in the horizontal direction, in which the vertical distance to the origin is "compressed" or "scaled". The tree is shown on the left of the figure before scaling. A scaling matrix is shown in the center of the figure, which when applied results in the scaled tree shown on the right of the figure. In the case shown, the scaling factor was chosen to be 0.5 (i.e., $s_x=1$, $s_y=0.5$) for 3-mode DCT. Following scaling and partitioning, as depicted on the right of the figure, the speckled dot has moved upward toward the root and then is at a higher level in relation to distance from the root than the solid dot.

It will be seen in the figure that after frequency scaling, coding tree construction can be performed in a similar manner to the octave band partitioning algorithm. In particular, construction starts with a small square and a large L-shape, and the L is partitioned into three squares and one smaller L-shape. A square is partitioned into four half-sized squares. It will be noted that some squares may be devoid of coefficients, (e.g., the hatched square), and may be deleted from the tree.

Figure 10:
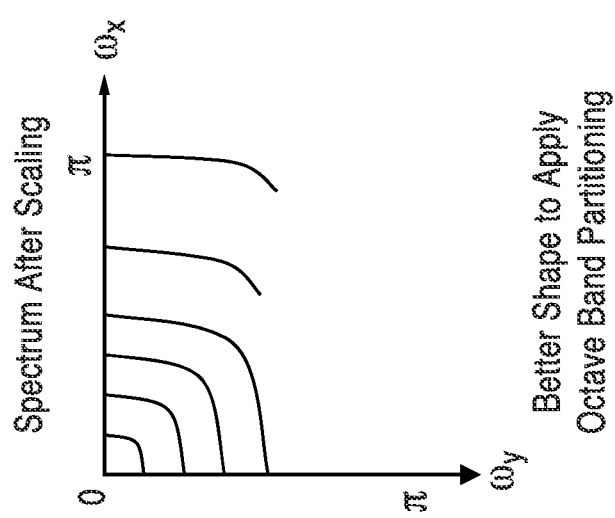
FIG. 10 is a graph showing the spectrum of horizontal blocks after scaling according to an aspect of the present invention.

FIG. 10 depicts block spectrum after scaling, which is seen to have a shape which is more amenable to octave band partitioning.

10. Design Trees Based on 5-Mode DCT.

In 5-mode DCT, two diagonal modes are added to 3-mode DCT tree construction. In particular, diagonal +45° and diagonal −45° are added. It should be noted that 2D-DCT does not distinguish ±45° patterns. Similar spectrum is produced in the DCT domain from ±45° patterns. One possibility for overcoming this problem is to treat the two patterns in a single mode. However, 2D-DCT is not a good choice for de-correlating image blocks in ±45°. The present invention overcomes this problem by using directional DCT and new trees which are capable of handling ±45° patterns.

By way of example and not limitation, the patterns discussed so far are handled as follows.

Non-directional Normal 2D-DCT+original octave band partitioning tree
Horizontal Normal 2D-DCT+horizontal tree
Vertical Normal 2D-DCT+vertical tree
Diagonal +45° Directional DCT+new tree for +45°
Diagonal −45° Directional DCT+new tree for −45°

In one embodiment of the invention, the encoder selects one mode from the five, encodes the block, and signals both the coded bitstream and the mode index to the decoder. It should be appreciated that the coded bitstream is decoded using SPRIGHT decoding.

11. Design Trees Based on Horizontal/Vertical Trees in 5-mode DCT.

The same approach as in 3-mode DCT is utilized to generate the trees for horizontal and vertical patterns. However, in 5-mode DCT, there are more modes to choose from and the blocks that are classified into horizontal or vertical patterns are subject to a more slanted spectrum.

In response to this, at least one embodiment of the present invention adjusts compression to beyond ½, such as to a scaling factor of ¼ in horizontal and/or vertical coding patterns.

Figure 11:
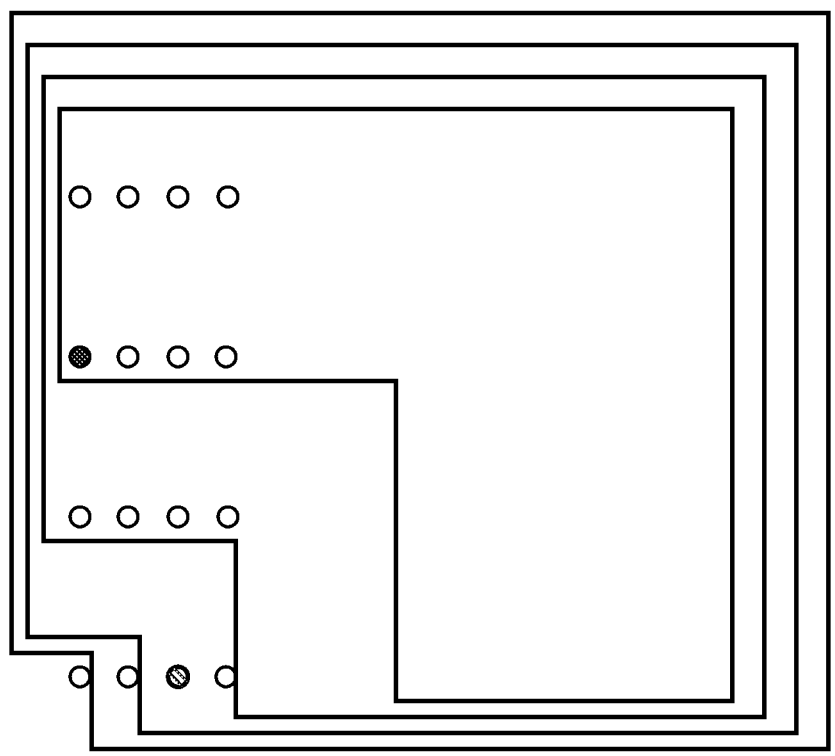
FIG. 11 is a block partitioning diagram showing the use of DCT trees for classifying blocks into horizontal and vertical patterns according to an aspect of the present invention.

FIG. 11 illustrates an example of partitioning for a horizontal case having 4×4 blocks. It will be appreciated that the coefficient depicted as speckled in FIG. 11 is two more levels higher than the coefficient depicted as solid in 5-mode DCT.

12. Design Trees Based on Directional DCT.

Figures 12A, 12B, 12C, 12D:
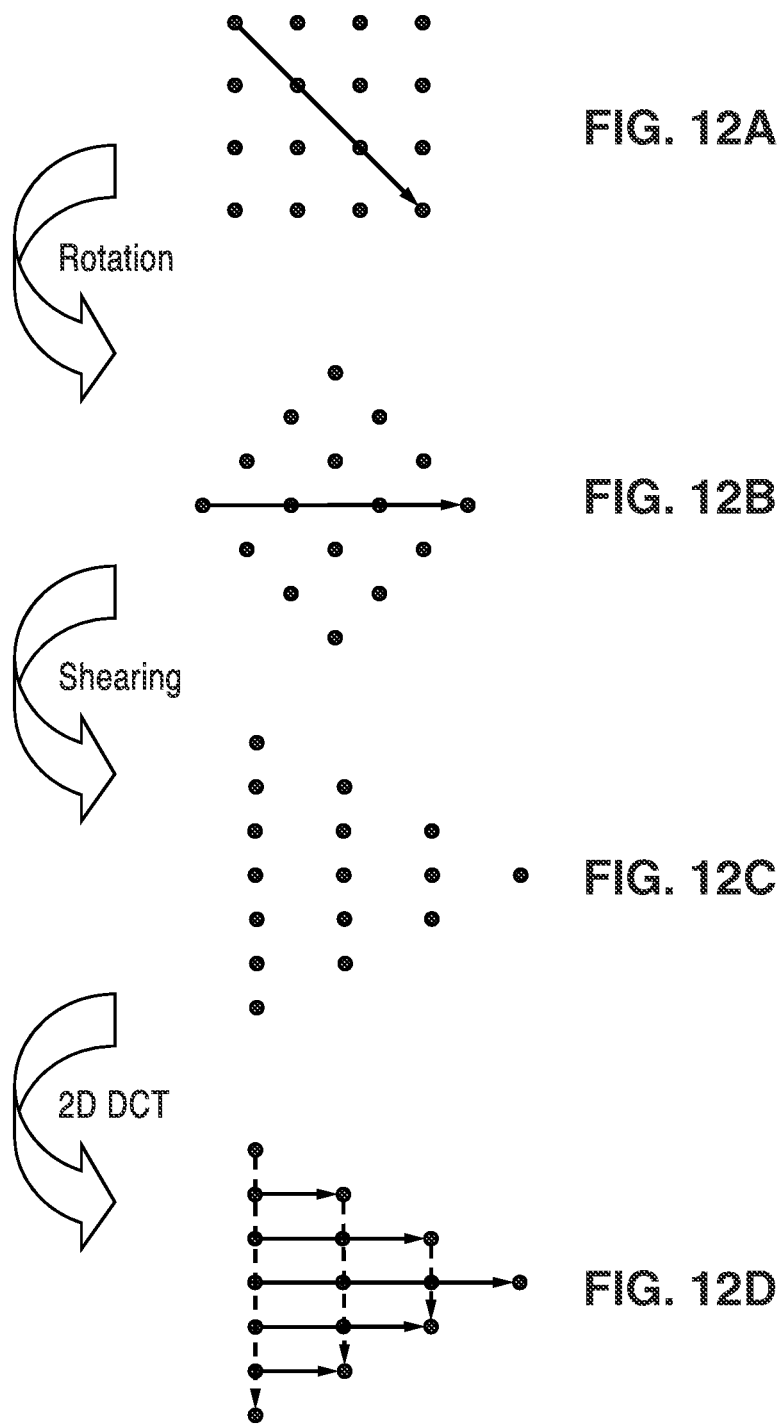
FIGS. 12A through 12D is a block partitioning diagram of directional DCT in which a diagonal pattern is rotated into a horizontal pattern and sheared according to an aspect of the present invention.

FIGS. 12A through FIG. 12D illustrate utilizing a form of directional DCT having a number of stages. Rotation is depicted in which a diagonal pattern FIG. 12A is converted to a horizontal pattern as seen in FIG. 12B. Shearing is then performed resulting in FIG. 12C. Then a DCT is performed along horizontal and vertical lines resulting in FIG. 12D.

It should be appreciated that in applying octave band partitioning for the directional DCT coefficients, frequency position must be found for each coefficient.

13. Positioning and Scaling of Directional DCT Coefficients.

In one aspect of the invention, a heuristic approach is taken to locate frequency positions for the directional DCT coefficients. For horizontal frequency ($\omega_x$) the total number of columns is counted after rotation and shearing, such as for example referred to as N. Then, for coefficients in the n-th column (n=0, . . . , N−1), $\omega_x$=n*π/N. For vertical frequency ($\omega_y$), the total number of coefficients is counted in the current column, such as referred to as M. Then for the m-th coefficient in the column (m=0, . . . , M−1), $\omega_y$=m*π/M.

Similarly, $\omega_y$ is scaled to compensate for the slanted spectrum. According to a preferred aspect of the invention, the block is rotated into the horizontal pattern so that it is $\omega_y$ that is scaled. When using 5 mode DCT, the scaling factor is preferably chosen to be ¼ (the same as the horizontal and vertical patterns).

Figure 13:
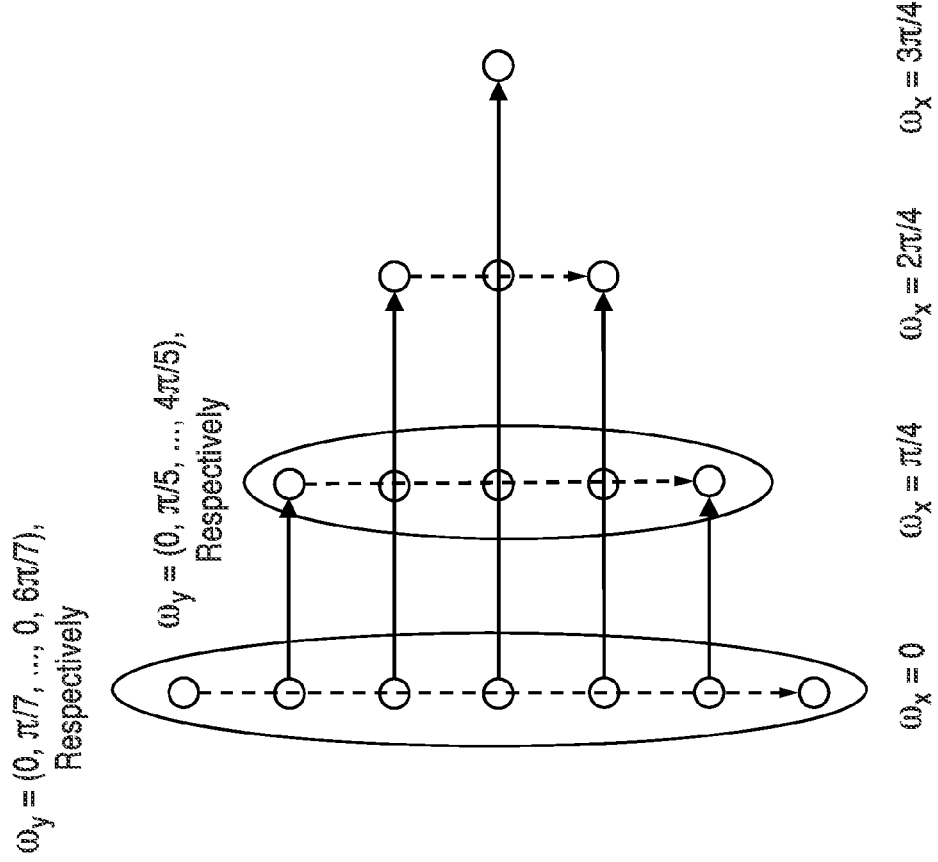
FIG. 13 is a coefficient position diagram of positioning and scaling to locate frequency positions for the directional DCT according to an aspect of the present invention.
Figure 16:
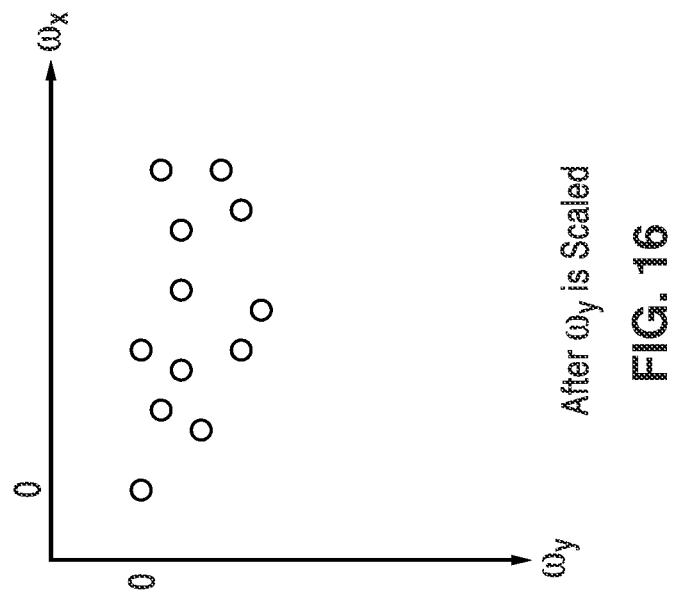
FIG. 16 is a graph showing DCT coefficients for the first example mapped in the frequency domain after vertical scaling according to an aspect of the present invention.

FIG. 13 depicts a scaled and rotated coefficient pattern showing the levels of $\omega_x$ along the bottom at $\omega_x$={0, π/4, 2π/4, and ω3π/4 }, with $\omega_y$ shown scaled in the first level (leftmost) as $\omega_y$={0, π/7, . . . , 6π/7}, and $\omega_y$={0, π/5, . . . , 4π/5} at the second level (second from left).

Figure 14:
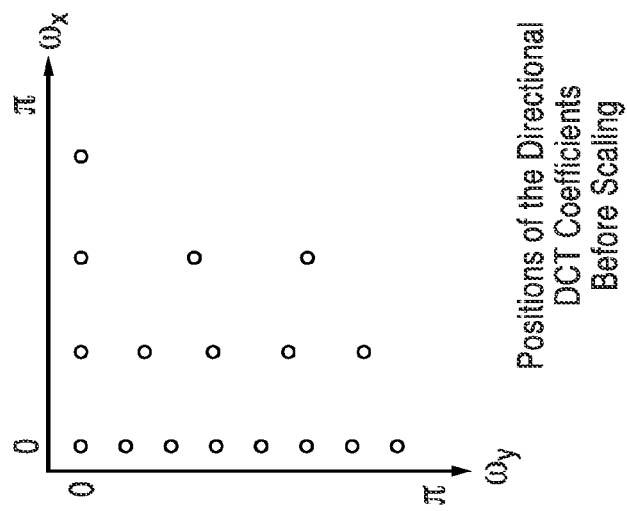
FIG. 14 is a graph showing the position of directional DCT coefficients before scaling according to an aspect of the present invention.

FIG. 14 illustrates positions of the directional DCT coefficients before scaling.

14. Constructing the Tree for SPRIGHT Coding.

In directional DCT, the positions of the coefficients are no longer in a grid. According to the present invention, however, the octave band partitioning technique is adapted to provide more generality with regard to properly handling coefficients having arbitrary positioning.

The root (whole block) is partitioned into one small square and one large L-shaped portion. The square encompasses the low-pass frequency band, such as given by:

$$|\omega_x|<\pi/2^K \text{ and } |\omega_y|<\pi/2^K.$$

wherein K is chosen such that the small square contains only DC (or the LL subband for DWT), while the large L-shape region contains all of the AC coefficients.

After partitioning the root (K−1), octave band partitioning is applied to the L-shaped portion, to produce three squares and one small L-shape. Each square having a bandwidth greater than $\pi/2^K$ is partitioned into four smaller squares. It should be appreciated that in using the term "partition", the parent-child relationship is also being enforced between the original frequency band and the partitions.

In the previous sections, the coding trees have been described having $2^K \times 2^K$ leaves, each of which is a small square, and it also represents a set that contains all coefficients in the frequency band. Those coefficients are then connected to the set. It should be recognized that some sets will be empty, wherein the corresponding nodes can be deleted. If a set only has one child, then it is deleted and the child is connected to its parent. The operation is iterative, until each non-leaf node has at least two child nodes.

Figure 15:
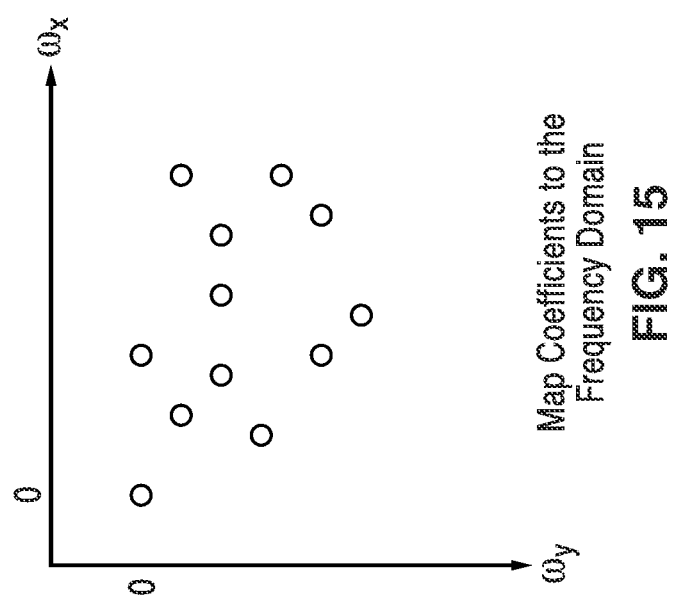
FIG. 15 is a graph showing DCT coefficients of a first example mapped to the frequency domain according to an aspect of the present invention.
Figure 18:
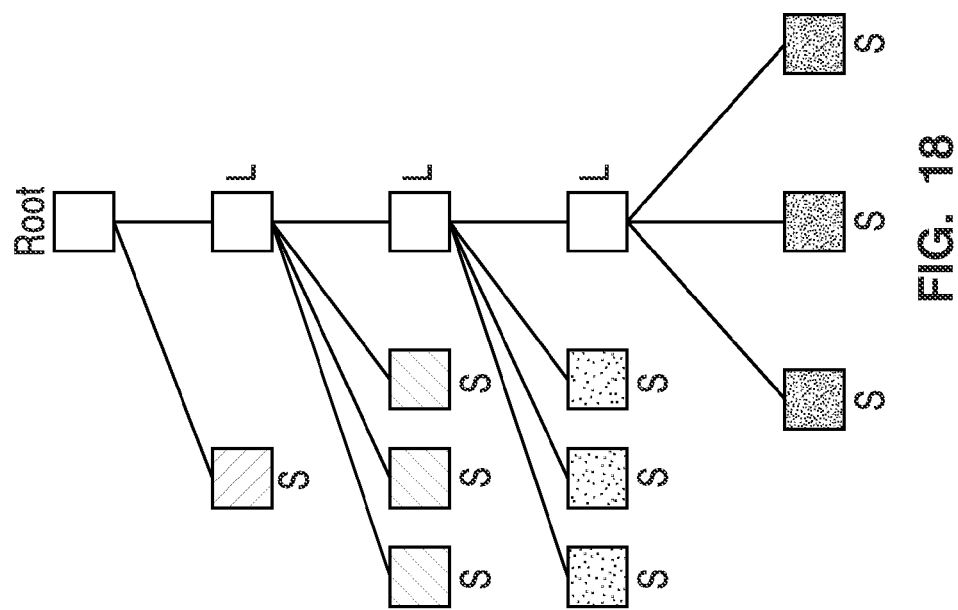
FIG. 18 is a coefficient tree data diagram example showing tree structure generated for the DCT coefficients mapped in FIG. 17.
Figure 17:
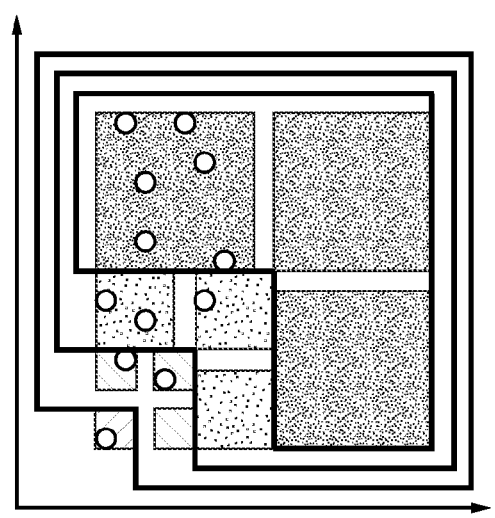
FIG. 17 is a block partitioning diagram for the first example showing partitioning coefficients into the L-shapes according to an aspect of the present invention.
Figure 19:
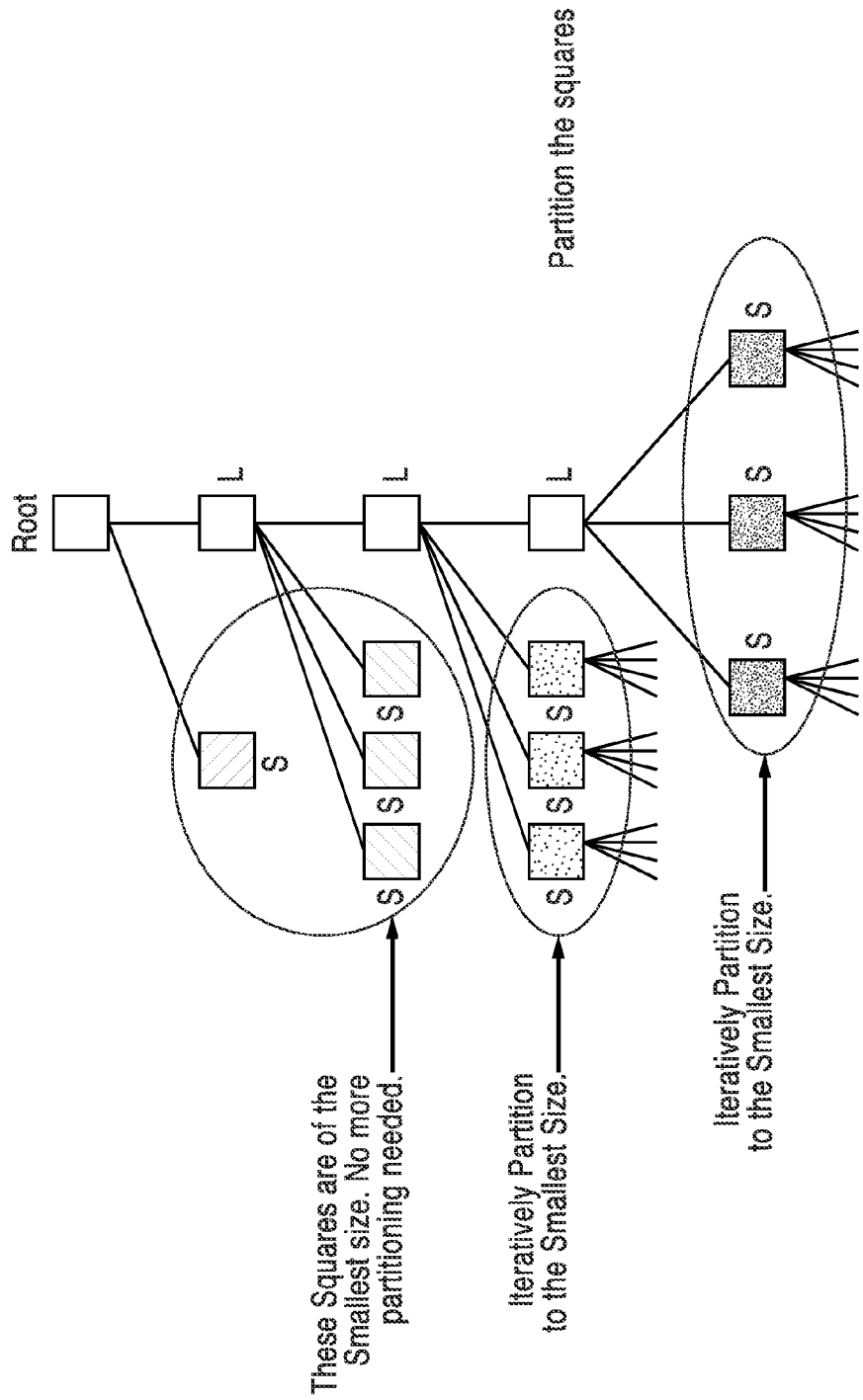
FIG. 19 is a coefficient tree data diagram showing tree structures being iteratively partitioned according to an aspect of the present invention.
Figure 20:
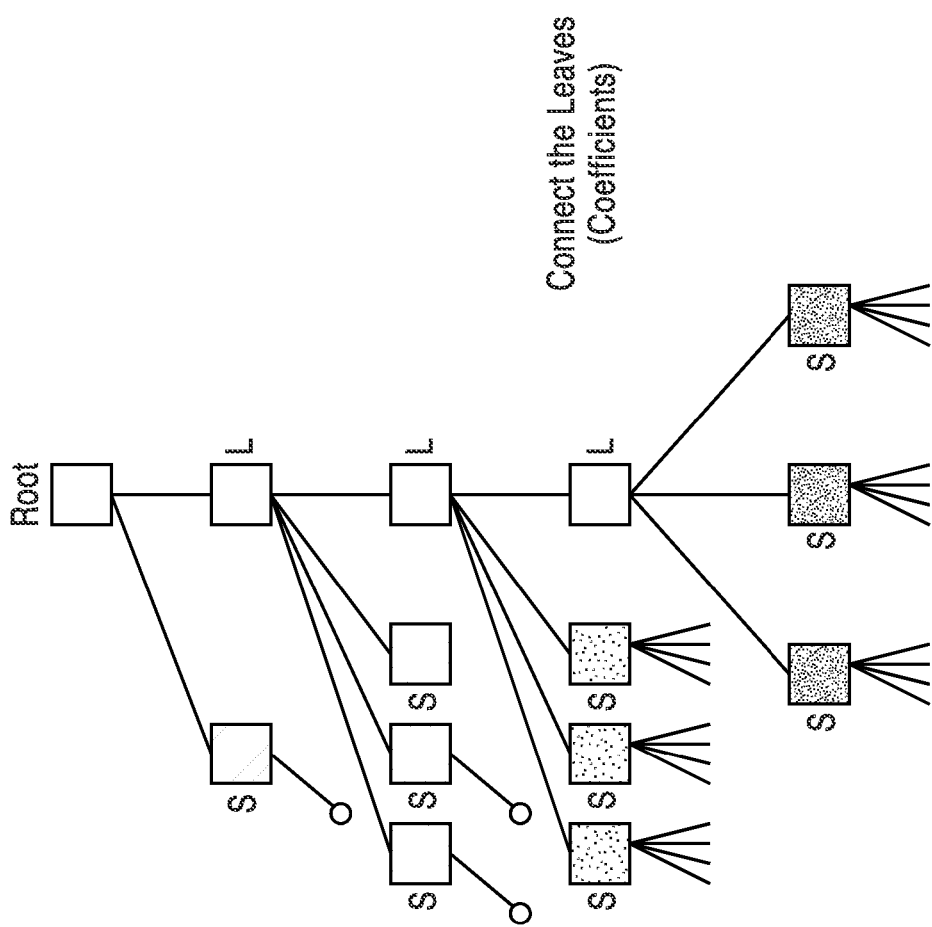
FIG. 20 is a coefficient tree data diagram showing connecting the leaves according to an aspect of the present invention.
Figure 21:
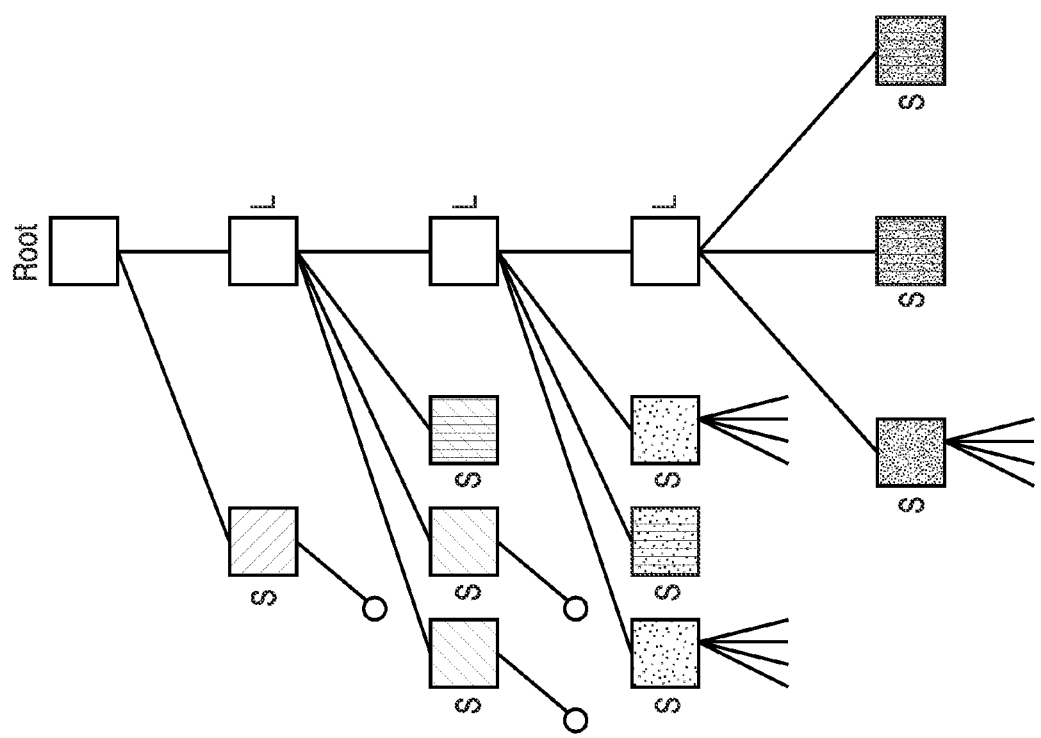
FIG. 21 is a coefficient tree data diagram showing dropping of unnecessary nodes according to an aspect of the present invention.

FIG. 15 through FIG. 21 illustrate an example embodiment of the present invention shown with steps for coding the coefficients. In FIG. 15 coefficients are mapped to the frequency domain, and scaled in the frequency domain in FIG. 16. Octave band partitioning is shown in FIG. 17 in which the root (i.e., whole block) is partitioned into one small square and one large L-shaped region. A coding tree is built in FIG. 18, and iteratively partitioned in FIG. 19. It will be noted that the first two levels in FIG. 19, as depicted within the upper "bubble", are of the smallest size wherein no more partitioning is needed, while the lower level, depicted as the lower two "bubbles", depict squares which should be iteratively partitioned to the smallest size. The design tree also depicts connecting of leaf (coefficients) into the upper two layers of the tree in FIG. 20. Unnecessary nodes are then dropped as per FIG. 21 from the partitioned block and design tree, as seen in the blocks having the vertical stripes (bars).

15. Design Trees Based on 9-mode DCT.

Figure 22:
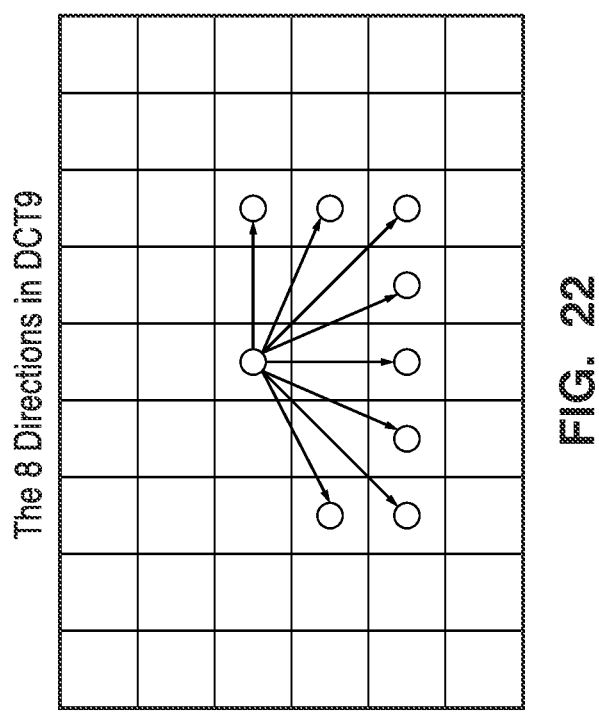
FIG. 22 is a graph showing the eight directions used in 9-mode DCT utilized according to an aspect of the present invention.

FIG. 22 illustrates using 9-mode DCT according to the present invention which provides one non-directional mode and eight directional modes. Under 9-mode DCT, the following combinations are put forth.

Non-directional Normal 2D-DCT+original octave band partitioning tree
Horizontal Normal 2D-DCT+horizontal tree
Vertical Normal 2D-DCT+vertical tree
Other Directions Directional DCT+new trees During SPRIGHT encoding, the encoder selects one mode from the nine generated according to the present invention, encodes the block, and signals both the coded bitstream and the mode index to the decoder. Positioning of the directional DCT coefficients and coding tree construction is similar to that defined in 5-mode DCT. The frequency of each coefficient is scaled as in 3-mode DCT or 5-mode DCT, while the scaling factor is changed to ⅛ in 9-mode DCT.

16. Mode Selection.

For a given block there may be multiple modes which provide efficient coding. The present invention preferably allows a selection of how the decisions are made when selecting a given mode under SPRIGHT.

(1) Pre-encoding.

The mode decision in this case is made before coding, such as on the basis of features detected in the block (e.g., geometric aspects). It will be appreciated that pre-encoding requires much less computational overhead than post encoding, but would typically not provide as significant of a coding efficiency gain. By way of example and not limitation, pre-encoding can be based on detecting average gradients in different directions.

(2) Post-encoding.

The mode decision can be made as a post-encoding decision, where the encoder encodes an image block using all possible modes. Distortion of the reconstructed block with respect to the original one is computed and the mode picked which yields the minimum rate-distortion cost. Post-encoding assures that the encoding is performed in the most efficient of the possible modes tested.

17. SPRIGHT Apparatus and Method.

Traditional approaches to coding use a single algorithm for the entropy coding, and thus do not select the form of entropy coding and its associated tree structure based on the geometry of the block being coded. It will be seen that conventional approaches perform encoding by relying on a fixed entropy coding method and thus utilizing a single fixed tree for encoding the current block. Fixed tree encoding methods do not benefit from very specific coding forms and they would have to be applied to all blocks. SPRIGHT coding, however, provides numerous entropy coding modes which can be selected in response to characteristics of the blocks. The present invention provides a method and apparatus for populating the multiple coding tree candidates of SPRIGHT as based on block directionality.

Figure 23:
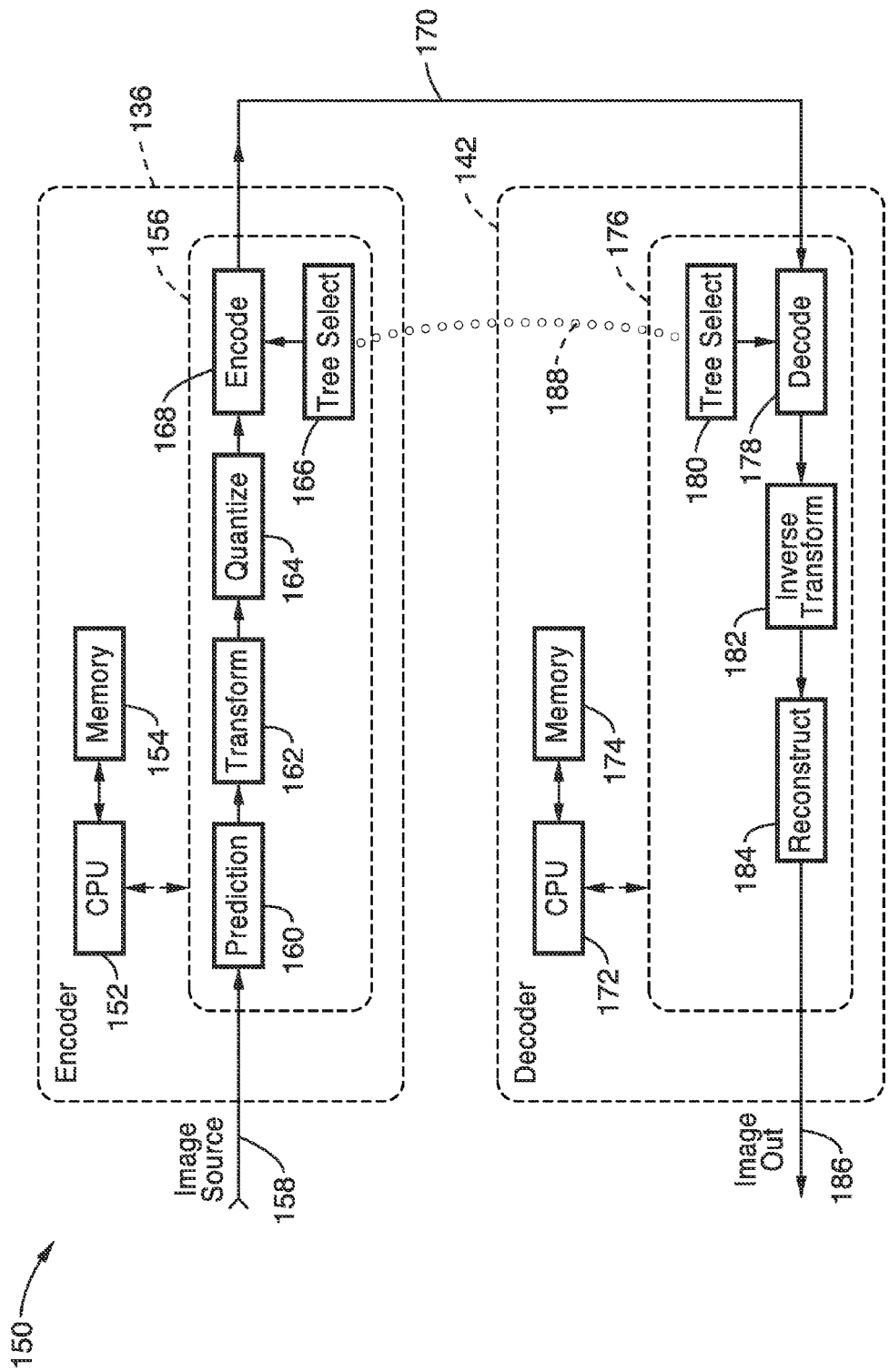
FIG. 23 is a block diagram of an encoder-decoder system, showing computer processors and memory configured for performing the adaptive entropy encoding and decoding according to an embodiment of the present invention.

FIG. 23 illustrates an embodiment 150 of a SPRIGHT based encoder 136 configured for selecting a coding tree from multiple coding trees and a decoder 142 for decoding the tree structure. Encoder 136 is shown comprising a computer processor (CPU) 152 and memory 154. It should be appreciated that these processing components may be implemented singularly, or as multiprocessors, and/or with any desired level of acceleration hardware, without departing from the teachings of the present invention. Programming executable on processor 152 performs the encoding 156 of an image source 158, performing prediction 160, transformation 162, quantization 164, tree selection 166 and encoding 168 to output encoded image data (or signal) 170. Tree selection is performed more particularly in response to the two-dimensional geometric relationships between the coefficients in the block, after which the block is encoded using the selected tree. Utilization of the selected tree structure can provide greatly increased coding efficiency over implementations in which the tree structure is inherent (fixed) within the coding technique used to perform the coding.

The decoder 142 is shown similarly implemented with processor element 172 and memory 174, and it may also comprise any desired processing components and combination with digital acceleration hardware without departing from the teachings of the present invention. In response to execution of programming, a decoding process 176 is performed in which signal 170 is received and decoded by a decoding block 178 which makes tree structure selection 180 prior to decoding. The output of the decoding block 178 is then inverse transformed 182 and the image is reconstructed as per block 184 to produce the final decoded image output 186.

A tree selection link 188 is shown between the tree selection during encoding and the tree selection used during decoding to represent an embodiment in which information about the chosen tree structure is communicated to decoder 142 to assure that it decodes the data in the manner in which it was encoded. Typically, information on the selected tree structure would be incorporated into predetermined bits of the encoded signal stream which is being sent to the decoder. It should also be appreciated that communication of tree structure for a given block may be communicated as bits from the encoder to the decoder, or alternatively the data from the encoder may be organized in a manner to inform the decoder of tree selection, or the decoder may otherwise determine a tree structure to use for decoding which is compatible with the encoding.

In the described example embodiment, the decoder always knows the tree structure used for coding a given block. For example, the tree structures are either pre-embedded into the executable of the decoder, or informed by the encoder at the beginning of a session.

When decoding, a decoder first distinguishes whether the current node is a leaf or not, then reads a BIT from the bitstream when it is a non-leaf, or reads a symbol from the stream for a leaf. A symbol may comprise one or more bits, depending on how it has been encoded, for example using exp-Golomb code.

Figure 24:
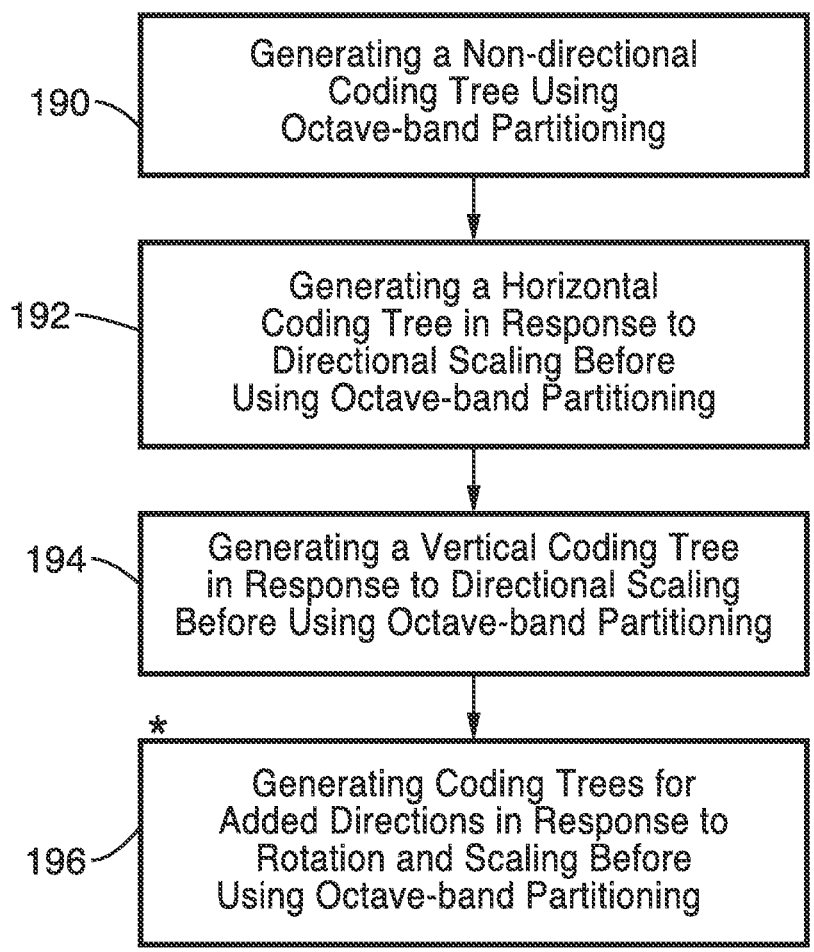
FIG. 24 is a flowchart of a method for generating design trees for use in set partitioning in generalized hierarchical trees with directionality according to an aspect of the present invention.

FIG. 24 illustrates an embodiment of a method for generating design trees for use in set partitioning in generalized hierarchical trees with directionality. A non-directional coding tree is generated 190 using octave-band partitioning. A horizontal coding tree is generated 192, and a vertical coding tree 194 in response to directional scaling before octave-band partitioning is performed. Optionally, coding trees for additional directions are also generated 196 in response to rotations and scaling performed prior to octave band partitioning.

Accordingly, it will be appreciated that the present invention encompasses various techniques for constructing trees for use in SPRIGHT coding. The schemes classify image blocks into different directional patterns, using normal 2D transforms or directional transforms to decorrelate the block, and to build trees accordingly. The trees are based on the octave band partitioning algorithm, which has been generalized in the present method in response to directionality. A way is shown for each of the different directions to find positions (2D frequency) of the resulting (directional) transform coefficients. In many instances the frequency of the transform coefficients are scaled before coding to shape the spectrum toward providing more efficient coding. The scaling factor is preferably determined by the total number of directions.

The invention also generalizes the octave band partitioning algorithm to deal with transform coefficients having arbitrary frequency positioning. The advantage of the proposed algorithm is that it can better capture the characteristics of the spectrum, and the resulting trees are capable of clustering zeros more efficiently using SPRIGHT.

From the discussion above it will be appreciated that the invention can be embodied in various ways, including the following:

1. Apparatus for generating multiple candidate coding trees for use during encoding, comprising: a computer configured for receiving and processing images and/or video frames; and programming executable on said computer for, generating a non-directional coding tree using octave-band partitioning; generating horizontal and vertical coding trees in response to, scaling frequency components in a horizontal or vertical direction, and octave-band partitioning to create multiple candidate coding trees adapted for horizontal and vertical directions.

2. The apparatus of embodiment 1, further comprising programming executable on said computer for generating diagonal coding trees, within said multiple candidate coding trees, in response to using directional transforms.

3. The apparatus of embodiment 1, wherein said multiple candidate coding trees are configured for controlling block encoding in response to a predetermined traversal of the tree structure selected from said multiple candidate coding trees.

4. The apparatus of embodiment 1, wherein each candidate coding tree, within said multiple candidate coding trees, is configured with leaf and non-leaf nodes in a specified arrangement; and wherein one or more leaf nodes are configured for containing coefficients associated with each non-leaf node.

5. The apparatus of embodiment 1, wherein each candidate coding tree, within said multiple candidate coding trees, is configured so that the state of each non-leaf node is represented by a bit indicating whether its descendent leaf nodes contain all zero coefficients, or do not contain all zero coefficients.

6. The apparatus of embodiment 1, wherein said multiple candidate coding trees are configured for retention within an encoder which selects a coding tree for use from said multiple candidate coding trees.

7. The apparatus of embodiment 1, wherein said octave-band partitioning is performed by partitioning of coefficients within said blocks into squares and L-shapes, in which said L-shapes are iteratively partitioned into squares.

8. The apparatus of embodiment 1, wherein said octave-band partitioning is completed when each square contains only one coefficient.

9. The apparatus of embodiment 1, wherein said multiple candidate coding trees are configured for use in coding the coefficients in a block after a transform is performed.

10. The apparatus of embodiment 9, wherein said transform comprises a non-directional or directional transform.

11. The apparatus of embodiment 1, further comprising programming configured for encoding of images and/or video frames utilizing a coding tree from said multiple candidate coding trees in response to programming for, partitioning an image of video frame into blocks; and performing a directional transform on a block within an encoder, after which a desired tree structure is selected from said multiple candidates coding trees to perform the coding with; wherein a coded tree is generated during coding in response to finding a frequency position for each coefficient and performing octave-band partitioning based on the frequency position of each coefficient.

12. The apparatus of embodiment 11, further comprising programming configured for categorizing the coefficients of the block into at least three categories including non-directional, horizontal and vertical from which the encoder selects one mode from the at least three categories for encoding the block.

13. The apparatus of embodiment 11, further comprising programming configured for categorizing the coefficients of the block into categories which include two different diagonal directions from which the encoder selects one mode from the five for encoding the block.

14. The apparatus of embodiment 11, further comprising programming configured for: categorizing the coefficients of the block into categories which include two different diagonal directions from which the encoder selects one mode from five possible modes for encoding the block; and wherein said categorization of diagonal directions are performed in response to a directional transform operation.

15. The apparatus of embodiment 11, further comprising programming configured for: applying a scaling matrix to the block prior to partitioning; wherein scaling by said scaling matrix is performed in response to geometric relationships of the block; and wherein said scaling comprises either vertical or horizontal scaling.

16. The apparatus of embodiment 11, wherein said encoding comprises embedded encoding in which the encoding is bit-plane based.

17. The apparatus of embodiment 1, wherein said encoding comprises embedded encoding in which the encoding is bit-plane based; and wherein trees generated during coding are configured so that non-leaf nodes in the selected tree have a high probability that all descendents contain sufficiently small coefficients to be quantized to zero in higher bit-planes.

18. The apparatus of embodiment 1, further comprising programming configured for adaptive entropy encoding within an image/video encoder using design trees, comprising: dividing an image or a video frame into blocks; decorrelating each block using a transform to create blocks of coefficients; quantizing the transform coefficients; selecting a desired tree structure, as the selected tree structure, from said multiple candidate trees in response to determination of geometric relationships within each of the blocks of coefficients for the image; and encoding each of the blocks of coefficients using clustering of zero coefficients in response to the selected tree structure and use of octave band partitioning; wherein a portion of the zero coefficients are eliminated from the encoded output in response to having non-leaf nodes of said selected tree structure represent that the respective leaf nodes contain only zero coefficients, and not coding descendent leaf nodes into an encoded output bit stream generated by said apparatus.

19. A system for adaptive encoding and decoding of images or videos, comprising: an encoder having a processing element and memory configured for image and/or video encoding; programming executable on said encoder processing element for performing the steps of, dividing an image or a video frame into blocks, decorrelating each block using a transform to generate blocks of transform coefficients, quantizing the transform coefficients for each of the blocks of transform coefficients, selecting a tree structure, as a selected tree structure, from a set of multiple candidate trees, including at least horizontal and vertical directions, in response to determination of geometric relationships within the block of coefficients for the image and/or video, and encoding the block using clustering of zero coefficients in response to the selected tree structure; wherein a portion of the zero coefficients are eliminated from the encoded output in response to having non-leaf nodes of the selected tree structure represent that respective leaf nodes contain only zero coefficients and not coding these descendent leaf nodes into an output bit stream directed to a decoder; a decoder having a processing element and memory configured for image and/or video decoding of the bitstream from said encoder; programming executable on said decoder processing element for outputting an image or video signal in response to performing the steps of, determining the selected tree structure used by said encoder in encoding the block, decoding leaves of the selected tree structure into coefficients of an output, outputting zero coefficients within the output in response to decoding non-leaf nodes without non-zero branches, performing dequantizing of the output, performing inverse transformation of the output, and reconstructing the image signal in response to receipt of the output.

20. A method for generating multiple candidate coding trees for use within an encoder during image and/or video encoding, comprising: generating a non-directional coding tree using octave-band partitioning; generating horizontal and vertical coding trees in response to, scaling frequency components in at least a horizontal and vertical direction, and octave-band partitioning to create multiple candidate coding trees adapted for at least horizontal and vertical directions.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. Apparatus for generating multiple candidate coding trees for use during encoding, comprising:
   (a) a computer processor configured for receiving and processing images, video frames, or a combination of images and video frames; and
   (b) a memory device coupled to said computer processor, said memory device storing programming executable on said computer processor for:
      (i) generating a non-directional coding tree using octave-band partitioning;
      (ii) generating horizontal and vertical coding trees in response to,
         (1) scaling frequency components in a horizontal or vertical direction, and
         (2) octave-band partitioning to create multiple candidate coding trees adapted for horizontal and vertical directions:
      (iii) wherein said multiple candidate coding trees are configured for retention within an encoder which selects a coding tree for use from said multiple candidate coding trees.

2. The apparatus recited in claim 1, further comprising programming executable on said computer for generating diagonal coding trees, within said multiple candidate coding trees, in response to using directional transforms.

3. The apparatus recited in claim 1, wherein said multiple candidate coding trees are configured for controlling block encoding in response to a predetermined traversal of the tree structure selected from said multiple candidate coding trees.

4. The apparatus recited in claim 1:
   wherein each candidate coding tree, within said multiple candidate coding trees, is configured with leaf and non-leaf nodes in a specified arrangement; and
   wherein one or more leaf nodes are configured for containing coefficients associated with each non-leaf node.

5. The apparatus recited in claim 1, wherein each candidate coding tree, within said multiple candidate coding trees, is configured so that the state of each non-leaf node is represented by a bit indicating whether its descendent leaf nodes contain all zero coefficients, or do not contain all zero coefficients.

6. The apparatus recited in claim 1, wherein said octave-band partitioning is performed by partitioning of coefficients within said blocks into squares and L-shapes, in which said L-shapes are iteratively partitioned into squares.

7. The apparatus recited in claim 1, wherein said octave-band partitioning is completed when each square contains only one coefficient.

8. The apparatus recited in claim 1, wherein said multiple candidate coding trees are configured for use in coding the coefficients in a block after a transform is performed.

9. The apparatus recited in claim 8, wherein said transform comprises a non-directional or directional transform.

10. The apparatus recited in claim 1, further comprising programming configured for encoding of images, video frames or a combination of images and video frames utilizing a coding tree from said multiple candidate coding trees in response to programming for,
    partitioning an image of video frame into blocks; and
    performing a directional transform on a block within an encoder, after which a desired tree structure is selected from said multiple candidates coding trees to perform the coding with;
    wherein a coded tree is generated during coding in response to finding a frequency position for each coefficient and performing octave-band partitioning based on the frequency position of each coefficient.

11. The apparatus recited in claim 10, further comprising programming configured for categorizing the coefficients of the block into at least three categories including non-directional, horizontal and vertical from which the encoder selects one mode from the at least three categories for encoding the block.

12. The apparatus recited in claim 10, further comprising programming configured for categorizing the coefficients of the block into categories which include two different diagonal directions from which the encoder selects one mode from the five for encoding the block.

13. The apparatus recited in claim 10, further comprising programming configured for:
categorizing the coefficients of the block into categories which include two different diagonal directions from which the encoder selects one mode from five possible modes for encoding the block; and
wherein said categorization of diagonal directions are performed in response to a directional transform operation.

14. The apparatus recited in claim 10, further comprising programming configured for:
applying a scaling matrix to the block prior to partitioning;
wherein scaling by said scaling matrix is performed in response to geometric relationships of the block; and
wherein said scaling comprises either vertical or horizontal scaling.

15. The apparatus recited in claim 10, wherein said encoding comprises embedded encoding in which the encoding is bit-plane based.

16. The apparatus recited in claim 1:
wherein said encoding comprises embedded encoding in which the encoding is bit-plane based; and
wherein trees generated during coding are configured so that non-leaf nodes in the selected tree have a high probability that all descendents contain sufficiently small coefficients to be quantized to zero in higher bit-planes.

17. The apparatus recited in claim 1, further comprising programming configured for adaptive entropy encoding within an image/video encoder using design trees, comprising:
dividing an image or a video frame into blocks;
decorrelating each block using a transform to create blocks of coefficients;
quantizing the transform coefficients;
selecting a desired tree structure, as the selected tree structure, from said multiple candidate trees in response to determination of geometric relationships within each of the blocks of coefficients for the image; and
encoding each of the blocks of coefficients using clustering of zero coefficients in response to the selected tree structure and use of octave band partitioning;
wherein a portion of the zero coefficients are eliminated from the encoded output in response to having non-leaf nodes of said selected tree structure represent that the respective leaf nodes contain only zero coefficients, and not coding descendent leaf nodes into an encoded output bit stream generated by said apparatus.

18. An apparatus for generating multiple candidate coding trees for use during encoding, comprising:
(a) a computer processor configured for receiving and processing images, video frames or a combination of images and video frames; and
(b) a memory device coupled to said computer, processor, said memory device storing programming executable on said computer processor for:
(i) generating a non-directional coding tree using octave-band partitioning;
(ii) generating horizontal and vertical coding trees in response to,
(1) scaling frequency components in a horizontal or vertical direction, and
(2) octave-band partitioning to create multiple candidate coding trees adapted for horizontal and vertical directions;
(iii) wherein said multiple candidate coding trees are configured for controlling block encoding in response to a predetermined traversal of the tree structure selected from said multiple candidate coding trees.

19. The apparatus recited in claim 18, further comprising programming executable on said computer for generating diagonal coding trees, within said multiple candidate coding trees, in response to using directional transforms.

20. An apparatus for generating multiple candidate coding trees for use during encoding, comprising:
(a) a computer processor configured for receiving and processing images, video frames or a combination of images and video frames; and
(b) a memory device coupled to said computer processor, said memory device storing programming executable on said computer processor for:
(i) generating a non-directional coding tree using octave-band partitioning;
(ii) generating horizontal and vertical coding trees in response to,
(1) scaling frequency components in a horizontal or vertical direction, and
(2) octave-band partitioning to create multiple candidate coding trees adapted for horizontal and vertical directions;
(iii) said programming further configured for encoding of images or video frames utilizing a coding tree from said multiple candidate coding trees in response to programming for,
(1) partitioning an image of video frame into blocks, and
(2) performing a directional transform on a block within an encoder, after which a desired tree structure is selected from said multiple candidates coding trees with which to perform the coding,
(3) wherein a coded tree is generated during coding in response to finding a frequency position for each coefficient and performing octave-band partitioning based on the frequency position of each coefficient.

* * * * *